United States Patent
Nishihara et al.

(10) Patent No.: US 8,693,891 B2
(45) Date of Patent: Apr. 8, 2014

(54) OPTICAL MODULATION APPARATUS AND OPTICAL MODULATION METHOD

(75) Inventors: Masato Nishihara, Kawasaki (JP);
Tomoo Takahara, Kawasaki (JP);
Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 304 days.

(21) Appl. No.: 13/048,150

(22) Filed: Mar. 15, 2011

(65) Prior Publication Data

US 2011/0229150 A1    Sep. 22, 2011

(30) Foreign Application Priority Data

Mar. 19, 2010 (JP) .................................. 2010-64531

(51) Int. Cl.
*H04J 14/06* (2006.01)
*H04B 10/04* (2011.01)
*H04B 10/00* (2013.01)

(52) U.S. Cl.
USPC ........... 398/195; 398/184; 398/205; 398/208; 398/188

(58) Field of Classification Search
USPC .................. 398/184, 195, 204, 208
See application file for complete search history.

(56) References Cited

U.S. PATENT DOCUMENTS

| | | | |
|---|---|---|---|
| 5,448,392 A | 9/1995 | Pophillat | |
| 5,596,667 A * | 1/1997 | Watanabe | 385/122 |
| 5,805,321 A * | 9/1998 | Ooi et al. | 398/98 |
| 6,341,026 B1 | 1/2002 | Watanabe | |
| 7,058,313 B2 | 6/2006 | Shimizu et al. | |
| 7,181,146 B1 * | 2/2007 | Yorks | 398/195 |
| 7,200,343 B2 | 4/2007 | Ikeuchi | |
| 7,657,190 B2 * | 2/2010 | Akiyama | 398/195 |
| 7,778,553 B2 * | 8/2010 | Yuki et al. | 398/183 |
| 7,817,923 B2 * | 10/2010 | Akiyama et al. | 398/188 |
| 8,045,856 B2 * | 10/2011 | Shen et al. | 398/65 |
| 2002/0167705 A1 | 11/2002 | Shimizu et al. | |
| 2003/0002112 A1 * | 1/2003 | Hirano et al. | 359/161 |
| 2004/0081470 A1 | 4/2004 | Griffin | |
| 2004/0190910 A1 * | 9/2004 | Akiyama et al. | 398/186 |

(Continued)

FOREIGN PATENT DOCUMENTS

JP    2004-516743    6/2004
JP    2007-329886    12/2007

OTHER PUBLICATIONS

U.S. Office Action issued Jan. 10, 2013 in related copending U.S. Appl. No. 13/048,148 (19 pages).

(Continued)

*Primary Examiner* — Commen Jacob
(74) *Attorney, Agent, or Firm* — Staas & Halsey LLP

(57) ABSTRACT

An optical modulation apparatus includes a first modulator, a second modulator, a multiplexer, a calculator and an adjustor. The first modulator configured to modulate light emitted by a light source using a first input signal and output a first modulated signal. The second modulator configured to modulate the light using a second input signal and output a second modulated signal. The multiplexer configured to multiplex the first and second modulated signals and output a multiplexed signal. The calculator configured to calculate a power difference between a higher-side frequency component having a frequency higher than a center frequency of the multiplexed signal and a lower-side frequency component having a frequency lower than the center frequency. The adjustor configured to adjust delays of the first and second input signals based on the power.

12 Claims, 20 Drawing Sheets

(56) References Cited

U.S. PATENT DOCUMENTS

| | | | |
|---|---|---|---|
| 2005/0213975 A1* | 9/2005 | Gottwald et al. | 398/65 |
| 2006/0263098 A1* | 11/2006 | Akiyama et al. | 398/188 |
| 2007/0092266 A1* | 4/2007 | Shimizu et al. | 398/198 |
| 2007/0230617 A1* | 10/2007 | Tao et al. | 375/302 |
| 2007/0264028 A1* | 11/2007 | Yuki et al. | 398/183 |
| 2008/0181620 A1* | 7/2008 | Sasaki | 398/198 |
| 2009/0034988 A1* | 2/2009 | Akiyama et al. | 398/198 |
| 2009/0041473 A1* | 2/2009 | Nishihara et al. | 398/188 |
| 2009/0245814 A1 | 10/2009 | Griffin | |
| 2009/0269080 A1* | 10/2009 | Akiyam et al. | 398/188 |
| 2010/0054738 A1* | 3/2010 | Yuki | 398/65 |
| 2010/0098435 A1* | 4/2010 | Akiyama | 398/188 |
| 2011/0076027 A1* | 3/2011 | Kiuchi | 398/141 |

OTHER PUBLICATIONS

Notice of Allowance mailed Jul. 18, 2013 in related co-pending U.S. Appl. No. 13/048,148 (13 pages).

U.S. Appl. No. 13/048,148, filed Mar. 5, 2011, Nishihara et al., Fujitsu Limited.

* cited by examiner

FIG. 12
TRANSMISSION CHARACTERISTIC OF OPTICAL FILTER 401a
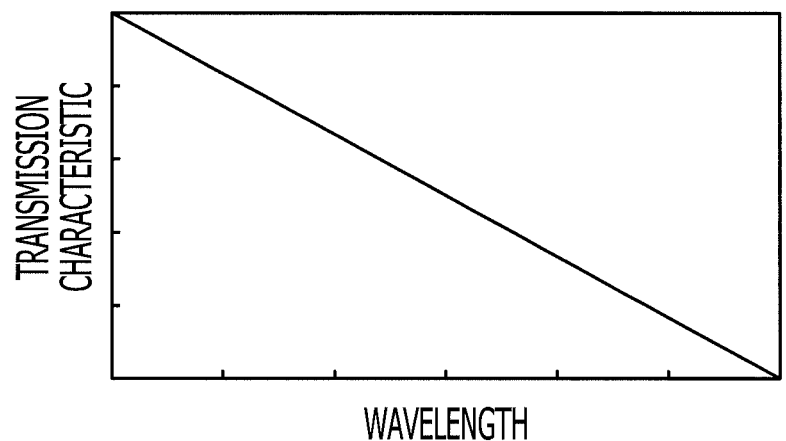
TRANSMISSION CHARACTERISTIC OF OPTICAL FILTER 401b
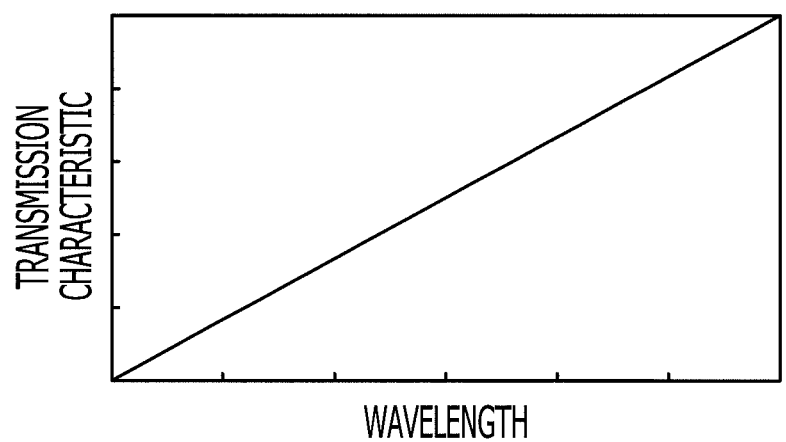

FIG. 19
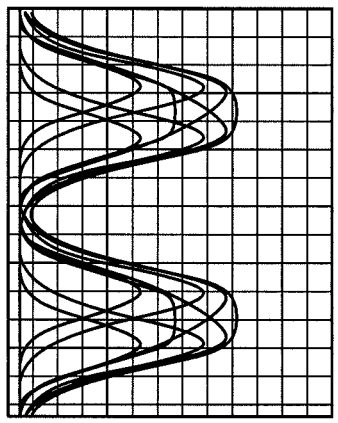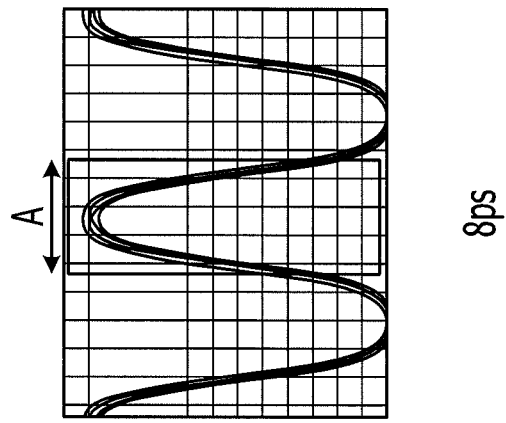
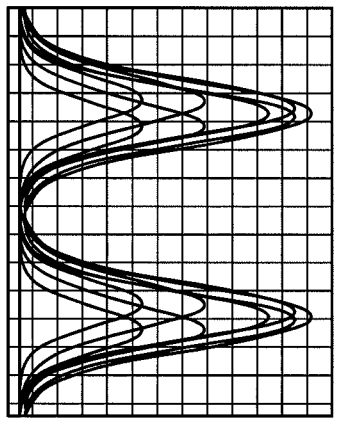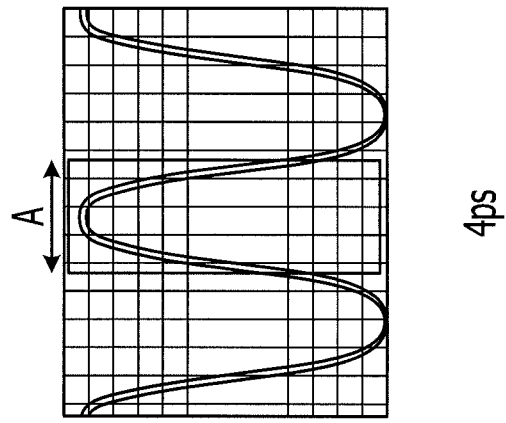
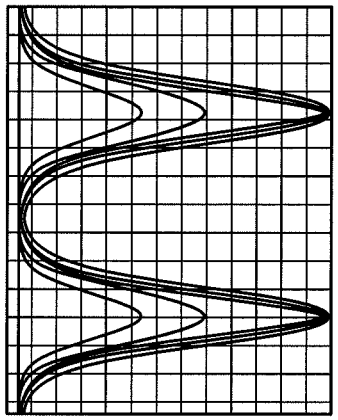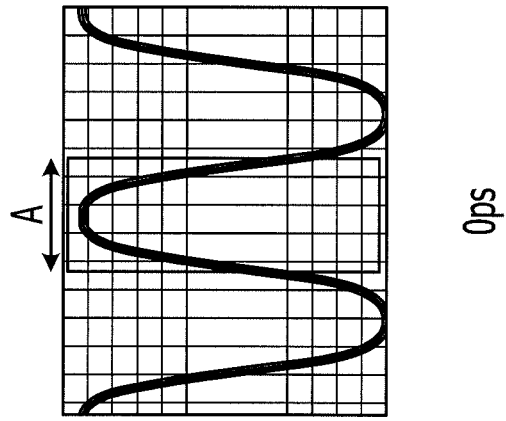
NRZ-DQPSK
RZ-DQPSK
DELAY DIFFERENCE   0ps   4ps   8ps

OPTICAL MODULATION APPARATUS AND OPTICAL MODULATION METHOD

CROSS-REFERENCE TO RELATED APPLICATIONS

This application is based upon and claims the benefit of priority of the prior Japanese Patent Application No. 2010-64531, filed on Mar. 19, 2010, the entire contents of which are incorporated herein by reference.

BACKGROUND

1. Field

Various embodiments described herein relate to optical modulation apparatuses and optical modulation methods.

2. Description of the Related Art

With an increase in transmission traffic, demand has been growing recently for introduction of a next-generation optical transmission system having a transmission capacity exceeding the existing 40 gigabit per second (Gbps). When signal transmission speed is simply increased for realization of the mass transmission capacity, realization of electric signal circuits to be used is difficult. For example, degradation of optical transmission signals, such as spectral degradation caused by optical filters and signal degradation caused by chromatic dispersion and optical noise accumulation, occurs. Accordingly, an optical transmission system adopting a multi-level phase modulation having good spectrum efficiency, optical signal-to-noise ratio (OSNR) tolerance, and non-linear tolerance seems to be promising. For example, quadrature phase-shift keying (QPSK) for four-level phase modulation is available as the multi-level phase modulation.

An optical modulation apparatus that includes a return-to-zero (RZ) modulator and adopts RZ differential QPSK (RZ-DQPSK) modulation is one type of QPSK optical modulation apparatuses. The RZ-DQPSK modulation is expected as a modulation candidate adopted in the next-generation optical transmission system because it characteristically has high spectrum efficiency and yields a modulated optical signal of a narrow spectrum.

The RZ-DQPSK optical modulation apparatus generally has an I-arm for superposing a data signal on an in-phase (I) component of light emitted by a light source and a Q-arm for superposing another data signal on a quadrature-phase (Q) component of the light emitted by the light source. The signals resulting from superposition of the data signals on the light at the I-arm and the Q-arm are multiplexed to be a DQPSK modulation signal. The RZ modulator then performs RZ modulation on the DQPSK modulation signal to yield an optical signal modulated according to RZ-DQPSK modulation.

At this time, the signals obtained at the I-arm and the Q-arm may be out of phase because of a temperature change or an aging change, for example. More specifically, a delay difference may occur between the I-component and the Q-component of the light to be multiplexed. The delay difference may impair the optical signal resulting from the RZ-DQPSK modulation. As a result, transmission performance decreases in optical transmission apparatuses for transmitting the optical signals.

To avoid such a circumstance, a technique is studied for monitoring power of an optical signal output from an RZ modulator and adjusting delays of data signals input to an I-arm and a Q-arm based on the monitoring result. FIG. 18 illustrates a configuration of such an optical modulation apparatus for adjusting the delays of the data signals. The optical modulation apparatus includes a laser diode (hereinafter, abbreviated as an "LD") 11 serving as a light source, a DQPSK modulator 12a, an RZ modulator 12b, drivers (hereinafter, abbreviated as "DRVs") 13a-13c, and phase shifters 14a-14c. The optical modulation apparatus also includes an optical coupler 21, a photo detector (hereinafter, abbreviated as a "PD") 22, a band-pass filter (hereinafter, abbreviated as a "BPF") 23, a power monitor (hereinafter, abbreviated as a "MON") 24, and a controller 30.

Light generated by the LD 11 is input to the DQPSK modulator 12a. An I-arm and a Q-arm of the DQPSK modulator 12a superpose data signals from the DRVs 13a and 13b on an I-component and a Q-component of the light, respectively. The I-component and the Q-component of the light having the data signals superposed thereon are multiplexed to be a DQPSK modulation signal. The RZ modulator 12b then performs RZ modulation on the DQPSK modulation signal. At this time, the RZ modulator 12b performs the RZ modulation on the DQPSK modulation signal using a clock signal CLK from the DRV 13c.

The optical coupler 21 splits the optical signal resulting from the RZ modulation. The PD 22 then converts the split optical signal into an electric signal. The electric signal passes through the BPF 23, whereby the MON 24 monitors power at a specific band of the electric signal. The controller 30 adjusts amounts of phase shift (hereinafter, referred to as phase-shift amounts) set in the phase shifters 14a and 14b in accordance with the monitoring result provided by the MON 24 to decrease a delay difference between the signals yielded at the I-arm and the Q-arm. At the same time, the controller 30 adjusts a phase-shift amount set in the phase shifter 14c in accordance with the monitoring result provided by the MON 24. As described above, the optical modulation apparatus monitors the power of the RZ-modulated signal and shifts the delays of the data signals in accordance with the monitoring result, thereby being able to decrease the delay difference between two signals to be multiplexed in multi-level phase modulation.

Japanese Unexamined Patent Application Publication No. 2007-329886 is an example of related art.

However, the method for monitoring the power of the signal and adjusting the delay difference in accordance with the monitoring result is based on an assumption that the RZ modulation is performed on the DQPSK modulation signal. An optical modulation apparatus without the RZ modulator unfortunately has difficulty appropriately controlling the delay difference. More specifically, an optical modulation apparatus adopting, for example, non return-to-zero DQPSK (NRZ-DQPSK) modulation does not perform RZ modulation on a DQPSK modulation signal. Accordingly, such an optical modulation apparatus has difficulty appropriately controlling a delay difference even if it monitors power of the signal.

To concretely explain this problem, FIG. 17 illustrates a signal waveform resulting from NRZ-DQPSK modulation and RZ-DQPSK modulation for each delay difference. More specifically, FIG. 17 illustrates waveforms of optical signals resulting from the NRZ-DQPSK modulation and the RZ-DQPSK modulation when the delay difference is 0 picoseconds (ps), 4 ps, and 8 ps. In each graph of FIG. 17, the horizontal axis represents time, whereas the vertical axis represents power.

As illustrated in FIG. 17, signal information at an area "A" illustrated in the drawing is extracted from the optical signal resulting from the RZ-DQPSK modulation through pulse carving of the RZ modulator. Accordingly, the MON 24 illustrated in FIG. 16 monitors power of the signal at the area "A" illustrated in FIG. 17. Since the power of the signal at the area "A" illustrated in FIG. 17 decreases as the delay difference increase, the controller 30 illustrated in FIG. 16 sets the phase-shift amounts so that a maximum value is monitored. In this way, the delay difference can be decreased.

In contrast, pulse carving is not performed by the RZ modulator on the optical signal resulting from the NRZ-DQPSK modulation. Accordingly, an average of the power of the optical signal of the whole area illustrated in each graph of FIG. 17 is monitored. As a result, since the monitored signal power does not change even if the delay difference changes, the monitoring result does not reflect the delay difference.

That is, as illustrated in FIG. 18, the monitored output decreases as the delay difference increases regarding the RZ-DQPSK modulation. In contrast, regarding the NRZ-DQPSK modulation, the monitored output is substantially constant even if the delay difference increases. Thus, monitoring the power of the non-RZ-modulation signal is not useful in appropriately controlling the delay difference between the two signals multiplexed by the DQPSK modulator. Since the delay difference is not appropriately controlled, the NRZ-DQPSK optical modulation apparatus unfortunately has difficulty suppressing degradation of the optical signal.

A similar problem occurs when, for example, polarization multiplexing is adopted in optical transmission. In the polarization multiplexing, data signals are superposed on different polarized components before the polarized components are multiplexed. A delay difference between the polarized components to be multiplexed degrades the multiplexed optical signal. Since the delay difference between the polarized components is not reflected in power of the multiplexed optical signal, it is difficult to suppress degradation of the optical signal by monitoring the power of the optical signal.

SUMMARY

In view of such problems, according to an aspect of an embodiment of the present invention a technology is disclosed to provide optical modulation apparatuses and optical modulation methods capable of appropriately controlling a delay difference between signals to be multiplexed in multi-level phase modulation and of suppressing degradation of an optical signal even if RZ modulation is not performed on a multi-level phase modulation signal.

An optical modulation apparatus includes a first modulator, a second modulator, a multiplexer, a calculator and an adjustor. The first modulator configured to modulate light emitted by a light source using a first input signal and output a first modulated signal. The second modulator configured to modulate the light using a second input signal and output a second modulated signal. The multiplexer configured to multiplex the first and second modulated signals and output a multiplexed signal. The calculator configured to calculate a power difference between a higher-side frequency component having a frequency higher than a center frequency of the multiplexed signal and a lower-side frequency component having a frequency lower than the center frequency. The adjustor configured to adjust delays of the first and second input signals based on the power.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 12 is a diagram illustrating a specific example of transmission characteristics of optical filters.

FIG. 19 is a diagram illustrating specific examples of a change in signal waveforms caused by a delay difference.

DETAILED DESCRIPTION

Figure 1:
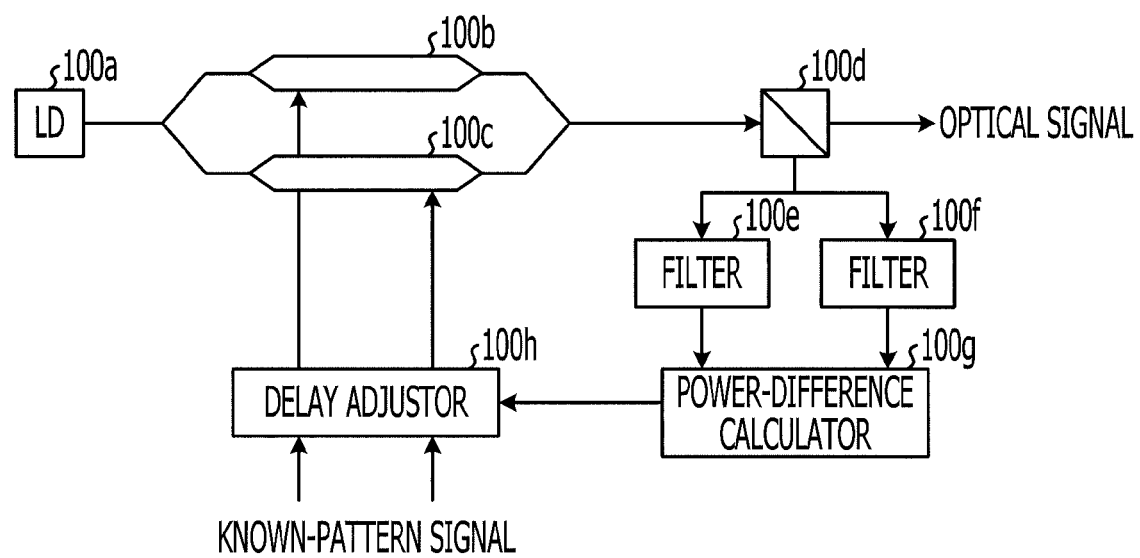
FIG. 1 is a block diagram illustrating a configuration of an optical modulation apparatus according to a first embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, embodiments of optical modulation apparatuses and optical modulation methods disclosed in this application will be described in detail with reference to the accompanying drawings. It should be noted that the embodiments do not limit this invention.

(First Embodiment)

FIG. 1 is a block diagram illustrating a configuration of an optical modulation apparatus according to a first embodiment. The optical modulation apparatus illustrated in FIG. 1 includes an LD 100a, a first modulator 100b, a second modulator 100c, an optical coupler 100d, filters 100e and 100f, a power-difference calculator 100g, and a delay adjustor 100h.

The LD 100a serving as a light source emits light of a predetermined wavelength. The first modulator 100b superposes a signal of a known pattern (hereinafter, referred to as a known-pattern signal) on a first component of the light emitted from the LD 100a, whereas the second modulator 100c superposes a known-pattern signal on a second component of the light emitted from the LD 100a. For example, an alternating signal having alternately repeated "0" and "1" serves as one example of the known-pattern signal. When the first modulator 100b and the second modulator 100c are included in a DQPSK modulator for performing DQPSK modulation, an I-component and a Q-component of light, for example, correspond to the first component and the second component of the light, respectively. The first and second components of the light having the known-pattern signals superposed thereon by the first and second modulators 100b and 100c, respectively, are multiplexed to be a multi-level phase modulation signal.

The optical coupler 100d splits the multi-level phase modulation signal. The optical coupler 100d then outputs one of the split signals as an optical signal and the other signal to the filters 100e and 100f. The filter 100e passes higher-side frequency components having frequencies higher than a center frequency of the input signal and outputs the higher-side frequency components of the signal to the power-difference calculator 100g. The filter 100f passes lower-side frequency components having frequencies lower than the center frequency of the input signal and outputs the lower-side frequency components of the signal to the power-difference calculator 100g.

The power-difference calculator 100g calculates a power difference between the higher-side frequency components and the lower-side frequency components output from the filters 100e and 100f, respectively. The delay adjustor 100h adjusts delays of the signals input to the first modulator 100b and the second modulator 100c so that the power difference calculated by the power-difference calculator 100g decreases.

An optical modulation method of the optical modulation apparatus having the foregoing configuration will now be described.

The first modulator 100b and the second modulator 100c superpose known-pattern signals on a first component and a second component of light emitted by the LD 100a, respectively. The first component and the second component are multiplexed to be a multi-level phase modulation signal resulting from multi-level phase modulation of the known-pattern signals on the light. The optical coupler 100d splits the multi-level phase modulation signal and inputs the split signal to the filters 100e and 100f.

Upon receiving the multi-level phase modulation signal, the filter 100e passes higher-side frequency components having frequencies higher than a center frequency of the multi-level phase modulation signal and outputs the higher-side frequency components to the power-difference calculator 100g. Similarly, upon receiving the multi-level phase modulation signal, the filter 100f passes lower-side frequency components having frequencies lower than the center frequency of the multi-level phase modulation signal and outputs the lower-side frequency components to the power-difference calculator 100g.

The power-difference calculator 100g calculates a power difference between the higher-side frequency components and the lower-side frequency components. The calculated power difference is small when the two signals output from the first modulator 100b and the second modulator 100c are in phase, whereas the power difference increases as a phase difference therebetween increases. That is, the power difference calculated by the power-difference calculator 100g increases as a delay difference between the two signals to be multiplexed in multi-level phase modulation increases. The delay adjustor 100h adjusts delays of the signals input to the first modulator 100b and the second modulator 100c so that the power difference calculated by the power-difference calculator 100g decreases. Since the delay difference between the two signals output from the first modulator 100b and the second modulator 100c is solved, degradation of an optical signal can be suppressed.

As described above, in accordance with this embodiment, a power difference between higher-side frequency components and lower-side frequency components of a modulation signal having known-pattern signals superposed thereon by the first modulator and the second modulator is calculated. Delays of the signals input to the first modulator and the second modulator are adjusted so that the calculated power difference decreases. Accordingly, even if RZ modulation is not performed on the multi-level phase modulation signal, a delay difference between the signals multiplexed in the multi-level phase modulation is appropriately controlled and degradation of an optical signal can be suppressed.

(Second Embodiment)

Figure 2:
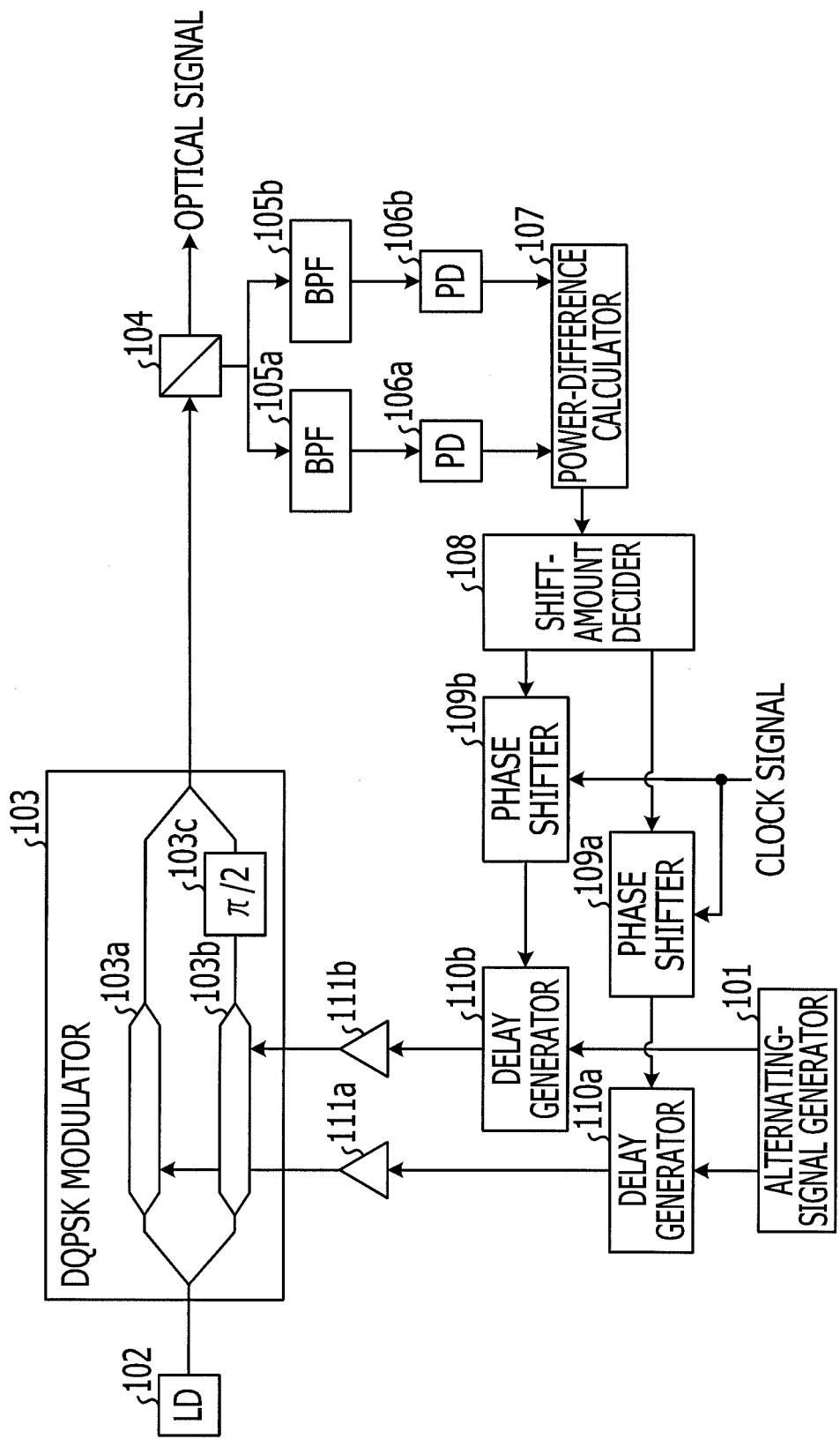
FIG. 2 is a block diagram illustrating a configuration of an optical modulation apparatus according to a second embodiment.

FIG. 2 is a block diagram illustrating a configuration of an optical modulation apparatus according to a second embodiment. The optical modulation apparatus illustrated in FIG. 2 includes an alternating-signal generator 101, an LD 102, a DQPSK modulator 103, an optical coupler 104, BPFs 105a and 105b, PDs 106a and 106b, a power-difference calculator 107, a shift-amount decider 108, phase shifters 109a and 109b, delay generators 110a and 110b, and DRVs 111a and 111b. Additionally, the DQPSK modulator 103 includes an I-arm modulator 103a, a Q-arm modulator 103b, and a phase shifter 103c.

The alternating-signal generator 101 generates an alternating signal in which "0" and "1" are alternately repeated. The alternating-signal generator 101 outputs the resulting in-phase alternating signals to the delay generators 110a and 110b. The alternating-signal generator 101 generates the alternating signal at the time of initial booting of the optical modulation apparatus and supplies the alternating signal to the DQPSK modulator 103 instead of data signals supplied during a normal operation of the optical modulation apparatus. That is, the alternating-signal generator 101 mainly operates at the time of initial booting of the optical modulation apparatus because the optical modulation apparatus can modulate given signals at the time of initial booting, for example, different from the normal operation of the optical modulation apparatus. On the other hand, during the normal operation of the optical modulation apparatus, data signals are input to the delay generators 110a and 110b instead of the alternating signals.

The LD 102 serving as a light source emits light of a predetermined wavelength. The DQPSK modulator 103 including, for example, a Mach-Zehnder interferometer, performs quadrature phase shift keying. More specifically, the I-arm modulator 103a superposes the alternating signal output from the DRV 111a on the light to perform binary phase shift keying, whereas the Q-arm modulator 103b superposes the alternating signal output from the DRV 111b on the light to perform binary phase shift keying. The phase shifter 103c shifts a phase of the signal resulting from the phase modulation by the Q-arm modulator 103b by $\pi/2$. The signal output from the I-arm modulator 103a and the signal output from the phase shifter 103c are multiplexed to be a DQPSK modulation signal. Hereinafter, an arm including the I-arm modulator 103a is referred to as an I-arm, whereas an arm including the Q-arm modulator 103b and the phase shifter 103c is referred to as a Q-arm.

The I-arm and Q-arm signals multiplexed by the DQPSK modulator 103 may have a delay difference. The delay difference is caused by, for example, an error, a temperature change, or an aging change in manufacturing of the optical modulation apparatus. The delay difference between the signals at the corresponding arms multiplexed by the DQPSK modulator 103 degrades the DQPSK modulation signal and, thus, transmission performance at the time of transmission of the DQPSK modulation signal. Additionally, when the alternating signals are input to the DQPSK modulator 103, the delay difference at the corresponding arms changes frequency components of the DQPSK modulation signal.

Figure 3:
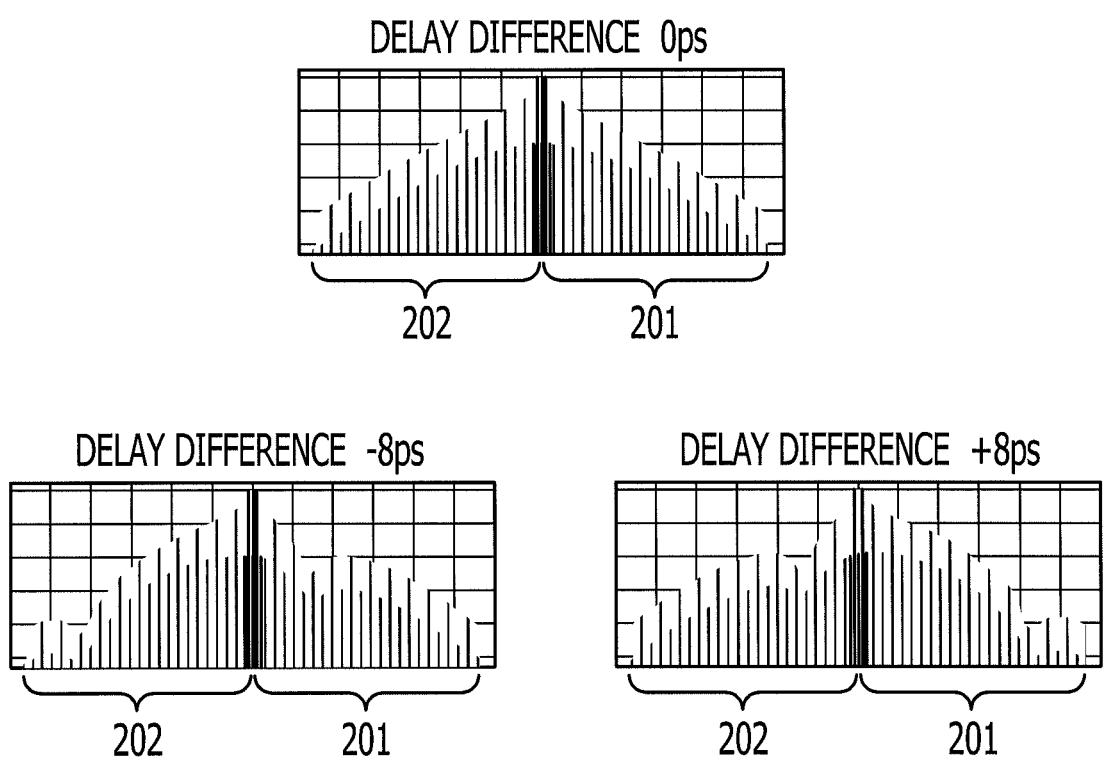
FIG. 3 is a diagram illustrating relations between a delay difference and frequency components.

More specifically, as illustrated in FIG. 3, when a delay difference between the signals at the corresponding arms is 0 picoseconds (ps), a spectrum characteristic of the DQPSK modulation signal is symmetrical about a center frequency. That is, power of higher-side frequency components 201 having frequencies higher than the center frequency of the DQPSK modulation signal is substantially equal to power of lower-side frequency components 202 having frequencies lower than the center frequency. In contrast, when the signals at the corresponding arms have a delay difference, the spectrum characteristic of the DQPSK modulation signal is asymmetric. More specifically, the power of the lower-side frequency components 202 is larger than that of the higher-side frequency components 201 when the delay difference is, for example, −8 ps, whereas the power of the higher-side frequency components 201 is larger than that of the lower-side frequency components 202 when the delay difference is, for example, +8 ps. Accordingly, the DQPSK modulator 103 modulates the alternating signals, whereby the delay difference between the signals at the corresponding arms is reflected in the spectrum characteristic of the DQPSK modulation signal.

Referring back to FIG. 2, the optical coupler 104 splits the DQPSK modulation signal. The optical coupler 104 outputs one of the split signals as an optical signal and the other signal to the BPFs 105a and 105b. The BPF 105a has a passband higher than the center frequency of the DQPSK modulation signal. The BPF 105a outputs the higher-side frequency components of the signal output from the optical coupler 104 to the PD 106a. The BPF 105b has a passband lower than the center frequency of the DQPSK modulation signal. The BPF 105b outputs the lower-side frequency components of the signal output from the optical coupler 104 to the PD 106b.

The passbands of the BPFs 105a and 105b will now be described more specifically with reference to FIG. 4. As described above, the BPF 105a has a passband higher than the center frequency of the DQPSK modulation signal. For example, referring to FIG. 4, the BPF 105a has a passband including a frequency f4 higher than a center frequency f3. Accordingly, a component of the frequency f4 is included in the higher-side frequency components in FIG. 4. In contrast, the BPF 105b has a passband lower than the center frequency of the DQPSK modulation signal. For example, referring to FIG. 4, the BPF 105b has a passband including a frequency f2 lower than the center frequency f3. Accordingly, a component of the frequency f2 is included in the lower-side frequency components in FIG. 4. The higher-side frequency components and the lower-side frequency components of the DQPSK modulation signal can be adjusted to the passbands of the BPFs 105a and 105b by appropriately changing a frequency of the alternating signal.

Figure 4:
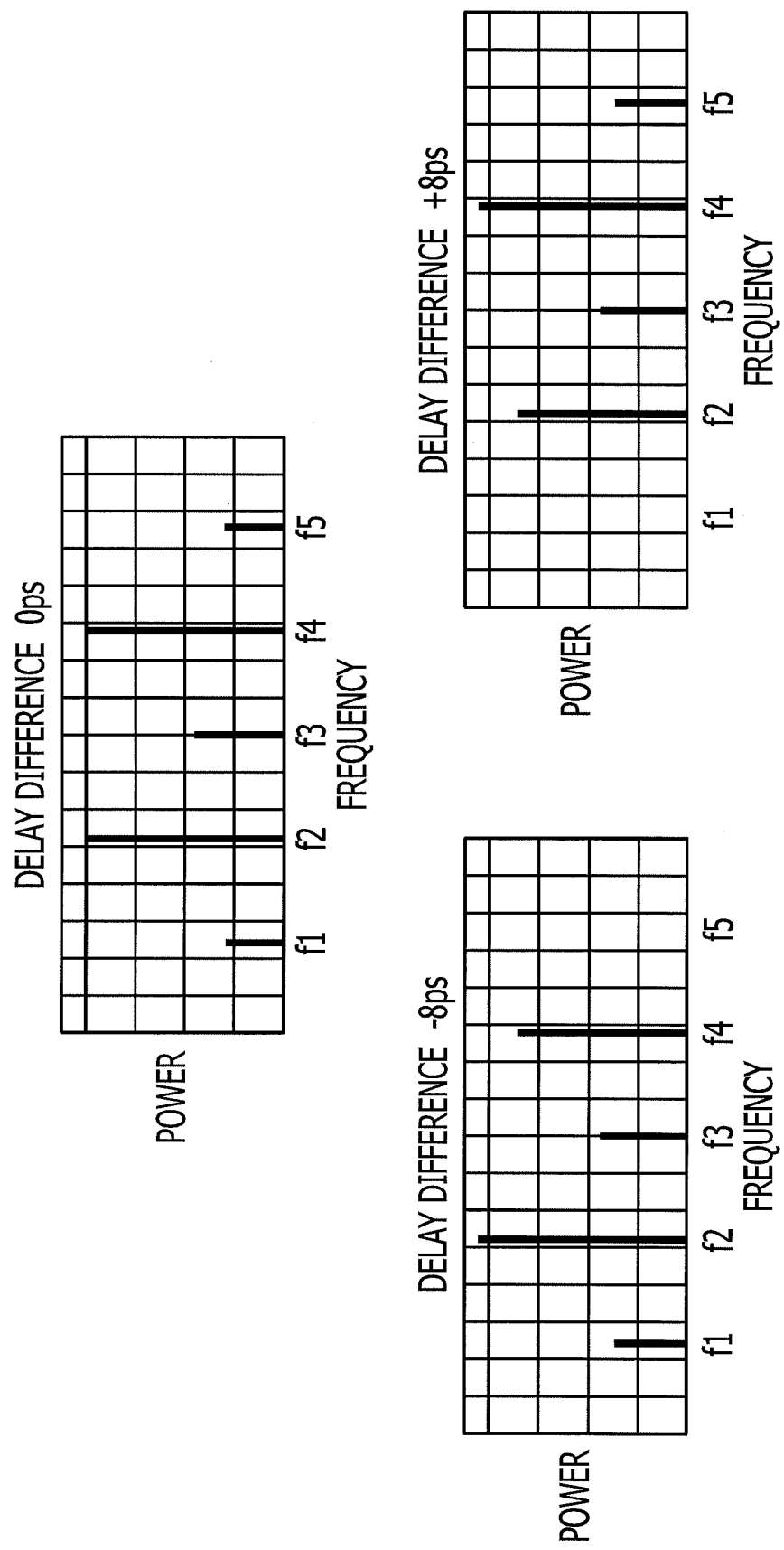
FIG. 4 is a diagram describing a passband of a band-pass filter.

As illustrated in FIG. 4, when the delay difference between the alternating signals input to the DQPSK modulator 103 is, for example, −8 ps, power of the lower-side frequency component of the frequency f2 is larger than that of the higher-side frequency component of the frequency f4. Thus, output power of the BPF 105b is larger than that of the BPF 105a. When the delay difference between the alternating signals is, for example, +8 ps, the power of the higher-side frequency component of the frequency f4 is larger than that of the lower-side frequency component of the frequency f2. Thus, the output power of the BPF 105a is larger than that of the BPF 105b.

Referring back to FIG. 2, the PD 106a converts the higher-side frequency components output form the BPF 105a into an electric signal, whereas the PD 106b converts the lower-side frequency components output from the BPF 105b into an electric signal. The power-difference calculator 107 calculates a power difference between the electric signals of the higher-side frequency components and the lower-side frequency components.

Based on the power difference calculated by the power-difference calculator 107, the shift-amount decider 108 decides phase-shift amounts to be generated in a clock signal by the phase shifters 109a and 109b. That is, the shift-amount decider 108 changes the phase-shift amounts of the clock signal, thereby changing delays of the alternating signals input to the DQPSK modulator 103. At this time, the shift-amount decider 108 changes the phase-shift amounts so that the power difference calculated by the power-difference calculator 107 approaches 0 and then notifies the phase shifters 109a and 109b of the respective changed phase-shift amounts.

Figure 5:
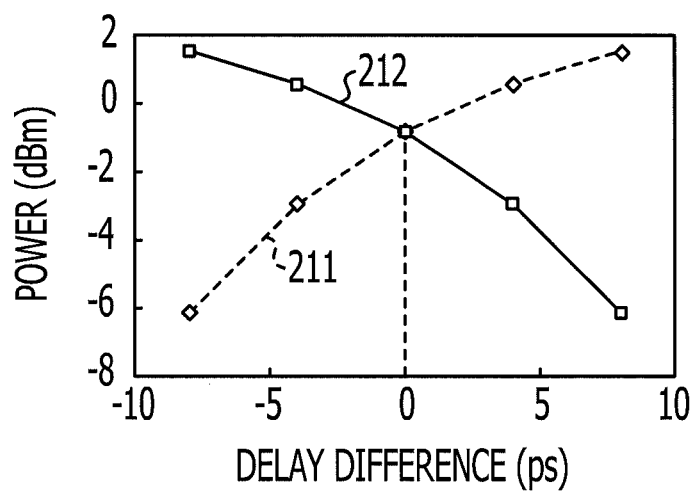
FIG. 5 is a diagram describing delay-difference control by a shift-amount decider.

Power 211 of the higher-side frequency components and power 212 of the lower-side frequency components change depending on the delay difference as illustrated in FIG. 5. When the delay difference is equal to 0, the power 211 of the higher-side frequency components matches the power 212 of the lower-side frequency components. As a result, the power difference is equal to 0. Accordingly, the shift-amount decider 108 determines whether a delay difference exists based on the power difference between the power 211 of the higher-side frequency components and the power 212 of the lower-side frequency components and then changes the phase-shift amounts of the clock signal to make the delay difference closer to 0.

More specifically, the shift-amount decider 108 changes the phase-shift amounts by a predetermined value and determines whether the power difference calculated by the power-difference calculator 107 has decreased. Upon determining that the power difference has decreased, the shift-amount decider 108 continuously changes the phase-shift amounts by the predetermined value. If the power difference has increased, the shift-amount decider 108 determines that the delay difference is controlled in the opposite direction and reverses the direction of changing the phase-shift amounts. More specifically, if the power difference has increased as a result of making the phase-shift amount set in the phase-shifter 109a larger than that set in the phase shifter 109b by the predetermined value, the shift-amount decider 108 makes the phase-shift amount set in the phase shifter 109a smaller than that set in the phase shifter 109b by the predetermined value. In this way, the shift-amount decider 108 changes the phase-shift amounts of the clock signal until the power difference becomes smaller than a predetermined threshold close to 0 to change the delays of the alternating signals input to the DQPSK modulator 103.

The shift-amount decider 108 stores the phase-shift amounts where the power difference calculated by the power-difference calculator 107 shows a minimum value. During the normal operation of the optical modulation apparatus, the shift-amount decider 108 sets these phase-shift amounts in the phase shifters 109a and 109b. In this way, even at the time of normal operation when data signals are input to the DQPSK modulator 103 instead of the alternating signals, the delay difference between the signals at the corresponding arms of the DQPSK modulator 103 can be minimized.

Each of the phase shifters 109a and 109b shifts the phase of the clock signal by the amount decided by the shift-amount decider 108. More specifically, the phase shifter 109a and 109b, supplied with the same in-phase clock signal, individually shift the phase of the clock signal based on the decision of the shift-amount decider 108.

The delay generators 110a and 110b delay the alternating signals in accordance with the clock signals having the phases shifted by the phase shifters 109a and 109b, respectively. More specifically, since the delay generators 110a and 110b are supplied with the same in-phase alternating signal but are supplied with the clock signals of different phases, the delay generators 110a and 110b output the alternating signals at different timings. During the normal operation of the optical modulation apparatus, the delay generators 110a and 110b delay data signals based on the clock signals having the phases shifted by the phase shifters 109a and 109b, respectively. At this time, the phase-shift amounts for minimizing the delay difference between the signals at the corresponding arms are set in the phase shifters 109a and 109b by the control of the delay difference using the alternating signals performed by the shift-amount decider 108. Accordingly, the delay generators 110a and 110b generates optimum delays for canceling delays generated in the DRVs 111a and 111b and waveguide of the DQPSK modulator 103 before outputting the data signals.

The DRVs 111a and 111b output the alternating signals or the data signals delayed by the delay generators 110a and 110b to the I-arm modulator 103a and the Q-arm modulator 103b of the DQPSK modulator 103, respectively. At this time, the DRVs 111a and 111b generate different delays in the alternating signals or the data signals because of a manufacturing error, for example. However, in this embodiment, the delay generators 110a and 110b in advance delays the alternating signals or the data signals by optimum amounts decided in consideration of the delay difference caused by the delays of the DRVs 111a and 111b, respectively.

Figure 6:
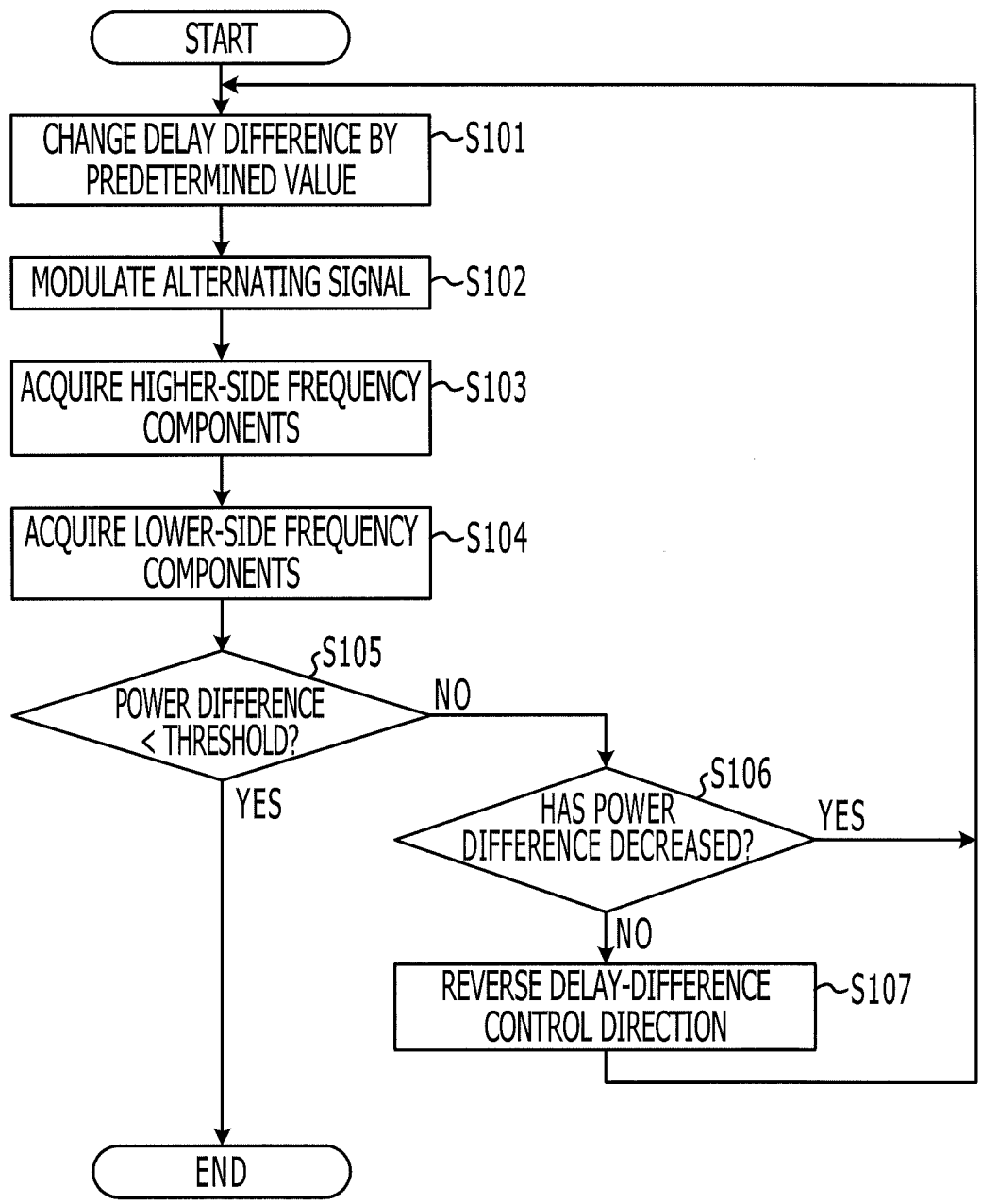
FIG. 6 is a flowchart illustrating a method for controlling a delay difference according to the second embodiment.

A delay-difference control method of the optical modulation apparatus having the foregoing configuration will now be described with reference to a flowchart illustrated in FIG. 6. FIG. 6 describes an operation performed when a power difference between power of higher-side frequency components and power of lower-side frequency components of a DQPSK modulation signal calculated by the power-difference calculator 107 is equal to or larger than a predetermined threshold. If the power difference is smaller than the predetermined threshold, delay-difference control is not needed because optimum phase-shift amounts are already decided by the shift-amount decider 108 and a delay difference between two signals at the corresponding arms of the DQPSK modulator 103 is close to 0.

If the power difference calculated by the power-difference calculator 107 is equal to or larger than the predetermined threshold, the shift-amount decider 108 changes phase-shift amounts set in the phase shifters 109a and 109b, thereby changing delays generated in the alternating signals by a predetermined value (S101). More specifically, the shift-amount decider 108 changes a difference between the phase-shift amounts set in the phase shifters 109a and 109b, thereby changing a difference between the delays generated in the alternating signals by the delay generators 110a and 110b by a predetermined amount, respectively. At this time, the shift-amount decider 108 stores the power difference calculated by the power-difference calculator 107.

Upon receiving the alternating signals generated by the alternating-signal generator 101, the delay generators 110a and 110b generate in the alternating signals the delays changed by the predetermined value and then output the alternating signals to the DRVs 111a and 111b, respectively. The DRVs 111a and 111b output the alternating signals to the I-arm modulator 103a and the Q-arm modulator 103b of the DQPSK modulator 103, where DQPSK modulation is executed (S102). More specifically, after the alternating signals are superposed on light emitted from the LD 102, the phase shifter 103c shifts a phase of the light having the alternating signal superposed thereon by the Q-arm modulator 103b by $\pi/2$. In this way, an I-component of the light is generated at the I-arm modulator 103a, whereas a Q-component of the light is generated at the Q-arm modulator 103b and the phase shifter 103c. The I component and the Q component are multiplexed in the DQPSK modulator 103 to be a DQPSK modulation signal.

The optical coupler 104 splits the DQPSK modulation signal and outputs one of the split signals as an optical signal. The other split signal is output to the BPFs 105a and 105b. The BPF 105a acquires higher-side frequency components (S103), whereas the BPF 105b acquires lower-side frequency components (S104). The PDs 106a and 106b convert the higher-side frequency components and the lower-side frequency components into electric signals, respectively. The power-difference calculator 107 calculates a power difference between the higher-side frequency components and the lower-side frequency components. The shift-amount decider 108 is notified of the calculated power difference.

The shift-amount decider 108 determines whether the power difference notified by the power-difference calculator 107 is smaller than a predetermined threshold (S105). If the power difference is smaller than the predetermined threshold (YES in S105), the shift-amount decider 108 determines that the delay difference is sufficiently small and is close to 0 and terminates the delay-difference control operation. After the termination of the delay-difference control operation, the phase-shift amounts currently set in the phase shifters 109a and 109b are continuously set as optimum phase-shift amounts. In this way, even when data signals are input to the DQPSK modulator 103 during the normal operation of the optical modulation apparatus, the delay generators 110a and 110b generate the optimum delays in the data signals and the delay difference between the two signals at the corresponding arms of the DQPSK modulator 103 becomes sufficiently small.

If the power difference is equal to or larger than the predetermined threshold (NO in S105), the shift-amount decider 108 compares the stored power difference calculated the last time with the power difference calculated this time (S106). If the power difference has decreased from the last one (YES in S106), the shift-amount decider 108 changes the delays of the alternating signals by the predetermined value just like the last time (S101) because it is considered that the delay difference is controlled in the intended direction. More specifically, for example, when the phase-shift amount set in the phase shifter 109a is increased in the previous delay-amount change, the shift-amount decider 108 sets a larger phase-shift amount in the phase shifter 109a this time. The method for changing the phase-shift amount does not have to be the same as the previous one. The delay difference of the alternating signals is at least changed in the same direction as the previous one by the predetermined value. For example, when the phase-shift amount set in the phase shifter 109a is increased in the previous delay-amount change as described above, the phase-shift amount set in the phase shifter 109b may be decreased this time.

If the power difference has increased from the last one (NO in S106), the shift-amount decider 108 reverses the delay-difference control direction because it is considered that the delay difference is controlled in the unintended direction (S107). After reversing the control direction, the shift-amount decider 108 changes the delays of the alternating signals by the predetermined value (S101). More specifically, when the phase-shift amount set in the phase shifter 109a is increased in the previous delay-amount change, a smaller phase-shift amount is set in the phase shifter 109a this time. In the method for changing the phase-shift amount, the delay difference of the alternating signals are at least changed in the direction opposite to the previous one by the predetermined value. For example, just like the foregoing example, when the phase-shift amount set in the phase shifter 109a is increased in the previous delay-amount change, the phase-shift amount set in the phase shifter 109b may be increased this time.

If the power difference between the higher-side frequency components and the lower-side frequency components is smaller than the predetermined threshold after repetition of such a delay-difference control operation, the delay difference between the two signals at the corresponding arms of the DQPSK modulator 103 becomes sufficiently small. If the phase-shift amounts for making the delay difference between the two signals sufficiently small are set in the phase shifters 109a and 109b, the delay difference between the two signals at the corresponding arms becomes sufficiently small even when the signals input to the delay generators 110a and 110b are not the alternating signals. More specifically, during the normal operation of the optical modulation apparatus, data signals input to the delay generators 110a and 110b are appropriately delayed and a delay difference of the two signals is made sufficiently small in the DQPSK modulator 103. In this way, degradation of the DQPSK modulation signal is suppressed and a decrease in transmission performance of an optical transmission apparatus for transmitting optical signals is suppressed.

Figure 7:
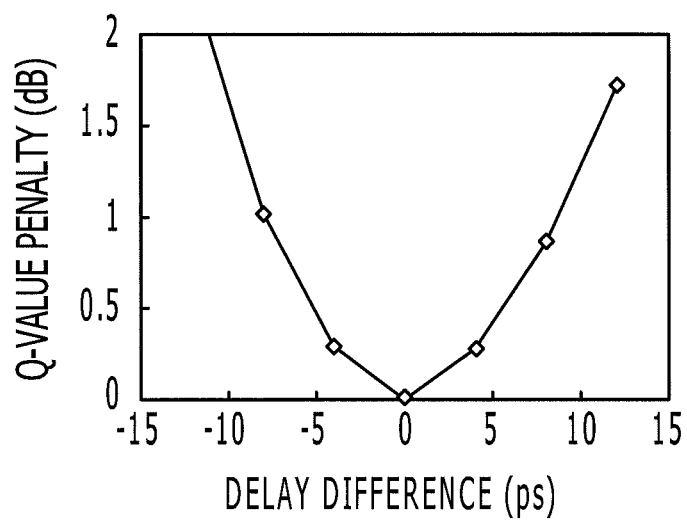
FIG. 7 is a diagram illustrating a specific example of a relation between a delay difference and transmission performance.

More specifically, for example, a relation illustrated in FIG. 7 is observed between the delay difference between the two signals at the corresponding arms of the DQPSK modulator 103 and the transmission performance of the optical transmission apparatus. More specifically, when the delay difference is 0 ps, Q-value penalty indicating the decrease in the transmission performance is also 0 dB. In contrast, when the delay difference is about 8 ps or −8 ps, for example, the Q-value penalty is about 1 dB. Accordingly, decreasing the delay difference of about 8 ps to 0 ps can improve the transmission performance by about 1 dB.

As described above, in accordance with this embodiment, a power difference between higher-side frequency components and lower-side frequency components of a DQPSK modulation signal resulting from DQPSK modulation of alternating signals is calculated. Delays of the alternating signals input to the DQPSK modulator are adjusted so that the power difference approaches 0. Accordingly, during the initial booting of the apparatus, optimum delays can be determined in consideration of an error caused in manufacturing of the apparatus. As a result, during the normal operation of the apparatus, the previously determined optimum delays can be generated in two signals input to the DQPSK modulator so that a delay difference between the two signals at the corresponding arms of the DQPSK modulator becomes sufficiently small and, thus, degradation of an optical signal can be suppressed. That is, even if RZ modulation is not performed on the DQPSK modulation signal, the delay difference between the signals to be multiplexed in multi-level phase modulation is appropriately controlled and degradation of an optical signal is suppressed.

(Third Embodiment)

In a third embodiment, higher-side frequency components and lower-side frequency components are acquired with etalon filters having periodical passbands instead of band-pass filters.

Figure 8:
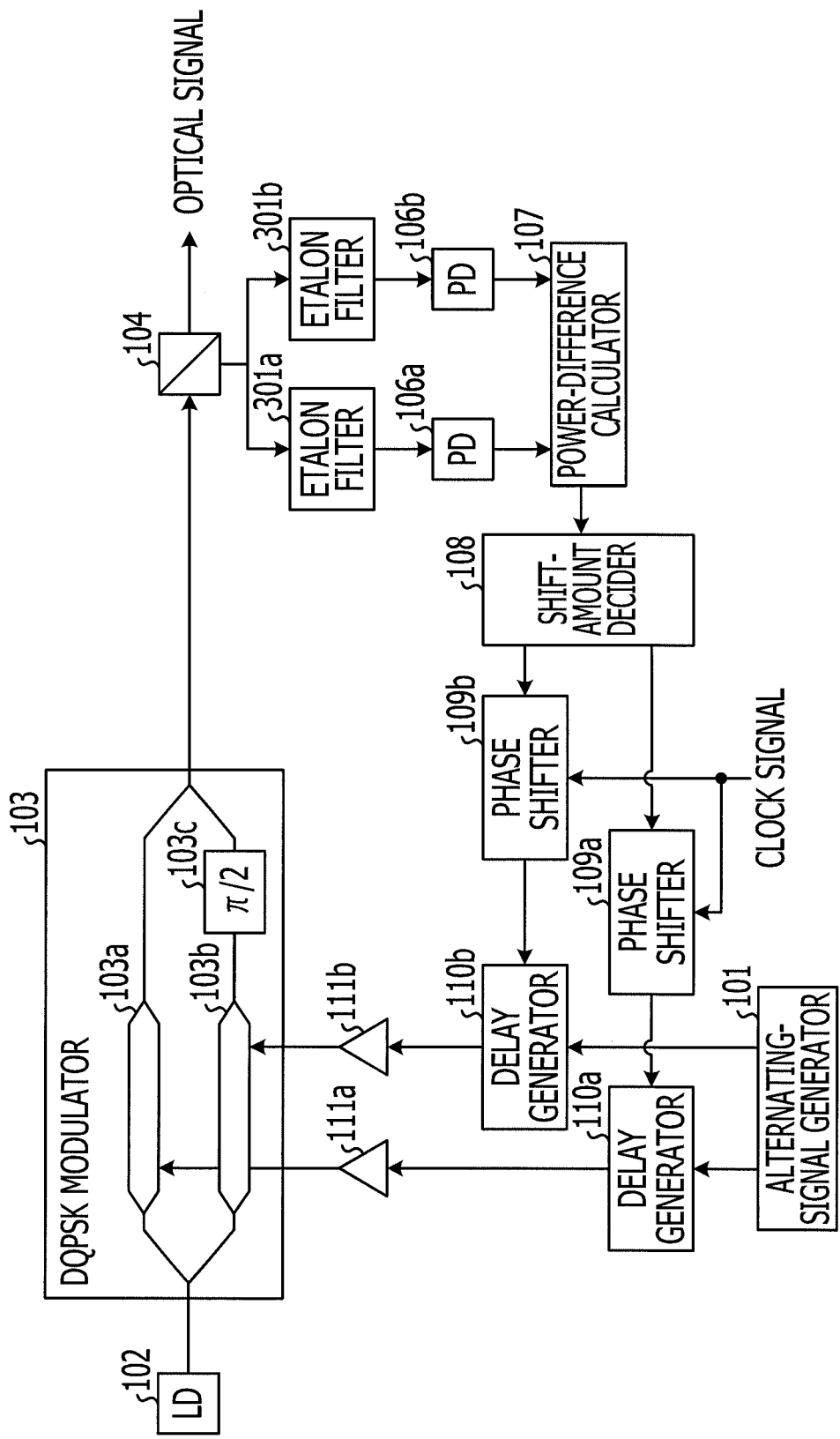
FIG. 8 is a block diagram illustrating a configuration of an optical modulation apparatus according to a third embodiment.

FIG. 8 is a block diagrams illustrating a configuration of an optical modulation apparatus according to the third embodiment. In FIG. 8, like reference characters designate the same or similar components illustrated in FIG. 2 to omit a description thereof. The optical modulation apparatus illustrated in FIG. 8 includes etalon filters 301a and 301b instead of the BPFs 105a and 105b of the optical modulation apparatus illustrated in FIG. 2.

Figure 9:
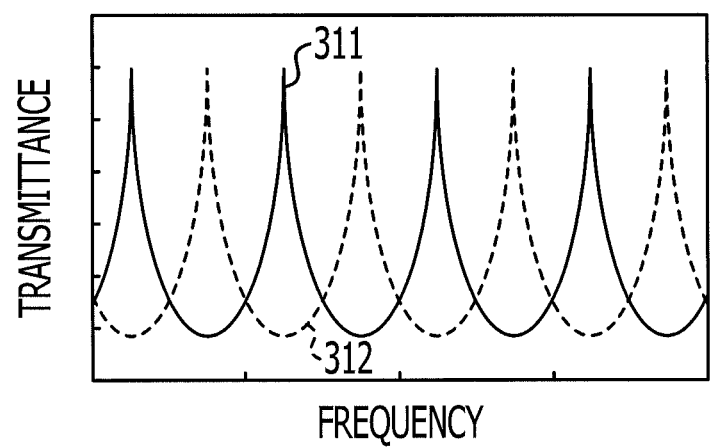
FIG. 9 is a diagram illustrating a specific example of transmission characteristics of etalon filters.

The etalon filters 301a and 301b have passbands of the same period called a free spectral range (FSR). Since the etalon filters 301a and 301b have the same FSR but different peak frequencies of the passbands, the etalon filters 301a and 301b have the passbands complementary to each other. For example, as illustrated in FIG. 9, one of the etalon filters 301a and 301b does not pass frequencies of a passband of the other etalon filter. More specifically, referring to FIG. 9 illustrating a transmission characteristic 311 of the etalon filter 301a and a transmission characteristic 312 of the etalon filter 301b, transmittance of the etalon filter 301b is low at a frequency band where transmittance of the etalon filter 301a is high. In contrast, the transmittance of the etalon filter 301a is low at a frequency band where the transmittance of the etalon filter 301b is high. Accordingly, the etalon filters 301a and 301b have periodical and complementary transmission characteristics.

Figure 10:
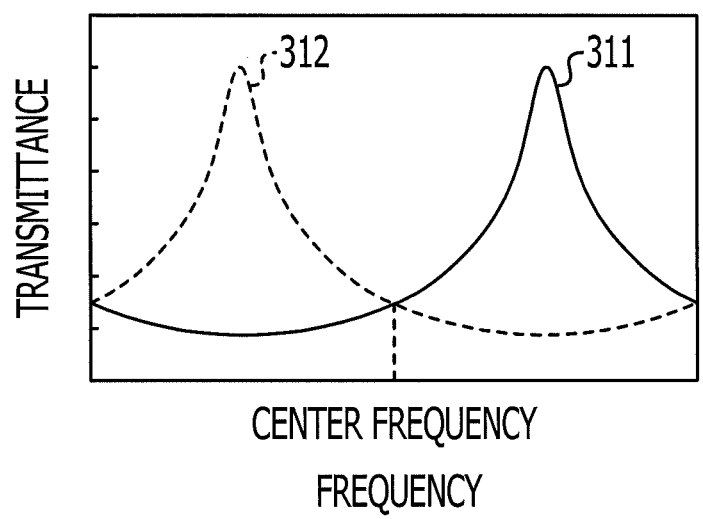
FIG. 10 is a diagram illustrating passbands of etalon filters.

The etalon filters 301a and 301b have passbands apart from a center frequency of an optical signal by a ¼ of the FSR. More specifically, as illustrated in FIG. 10, the etalon filter 301a has a passband higher than the center frequency by ¼ of the FSR and passes the higher-side frequency components. The etalon filter 301b has a passband lower than the center frequency by ¼ of the FSR and passes the lower-side frequency components. In this way, the etalon filters 301a and 301b output the higher-side frequency components and the lower-side frequency components just like the BPFs 105a and 105b in the second embodiment, respectively.

In this embodiment, since the etalon filters 301a and 301b have the periodical passbands, the higher-side frequency components and the lower-side frequency components can be acquired with a pair of the etalon filters 301a and 301b even if the center frequency of the optical signal changes. More specifically, since a band-pass filter generally has a specific passband, a band-pass filter suitable for each center frequency is prepared when the center frequency of the optical signal changes because of a change in wavelength of light emitted by an LD 102, for example. Accordingly, a communication system using optical signals of a plurality of wavelengths includes, for each wavelength, band-pass filters that have different transmission characteristics and acquire the higher-side frequency components and the lower-side frequency components, which leads to an increase in cost.

In accordance with this embodiment, the use of one pair of the etalon filters 301*a* and 301*b* can overcome this disadvantage even if the wavelength of the optical signal changes by adjusting the FSR of the etalon filters 301*a* and 301*b* in a communication system in which the center frequency of the optical signal changes at regular intervals. More specifically, even if the center frequency changes, the higher-side frequency components and the lower-side frequency components can be acquired with one pair of the etalon filters 301*a* and 301*b* having the FSR corresponding to the change of the center frequency of the optical signal. As a result, parts can be commonly used.

Since a delay-difference control method of the optical modulation apparatus according to this embodiment is similar to that according to the second embodiment except that the higher-side frequency components and the lower-side frequency components are acquired by the etalon filters 301*a* and 301*b*, a description thereof is omitted.

As described above, in accordance with this embodiment, higher-side frequency components and lower-side frequency components of a DQPSK modulation signal are acquired with etalon filters, a power difference between these frequency components is calculated, and a delay difference between alternating signals input to the DQPSK modulator is controlled so that the power difference approaches 0. Accordingly, during the initial booting of the apparatus, optimum delays can be determined in consideration of an error caused in manufacturing of the apparatus. As a result, during the normal operation of the apparatus, the previously determined optimum delays can be generated in two signals input to the DQPSK modulator so that a delay difference between the two signals at the corresponding arms of the DQPSK modulator becomes sufficiently small and, thus, degradation of an optical signal can be suppressed. That is, even if RZ modulation is not performed on the DQPSK modulation signal, the delay difference between the signals to be multiplexed in multi-level phase modulation is appropriately controlled and degradation of an optical signal is suppressed.

Additionally, even if wavelength of light emitted by a light source changes, the higher-side frequency components and the lower-side frequency components can be acquired with a pair of etalon filters. As a result, parts of the optical modulation apparatus can be commonly used and cost can be decreased.

(Fourth Embodiment)

In a fourth embodiment, higher-side frequency components and lower-side frequency components are acquired with optical filters having transmission characteristics corresponding to wavelength of light instead of band-pass filters.

Figure 11:
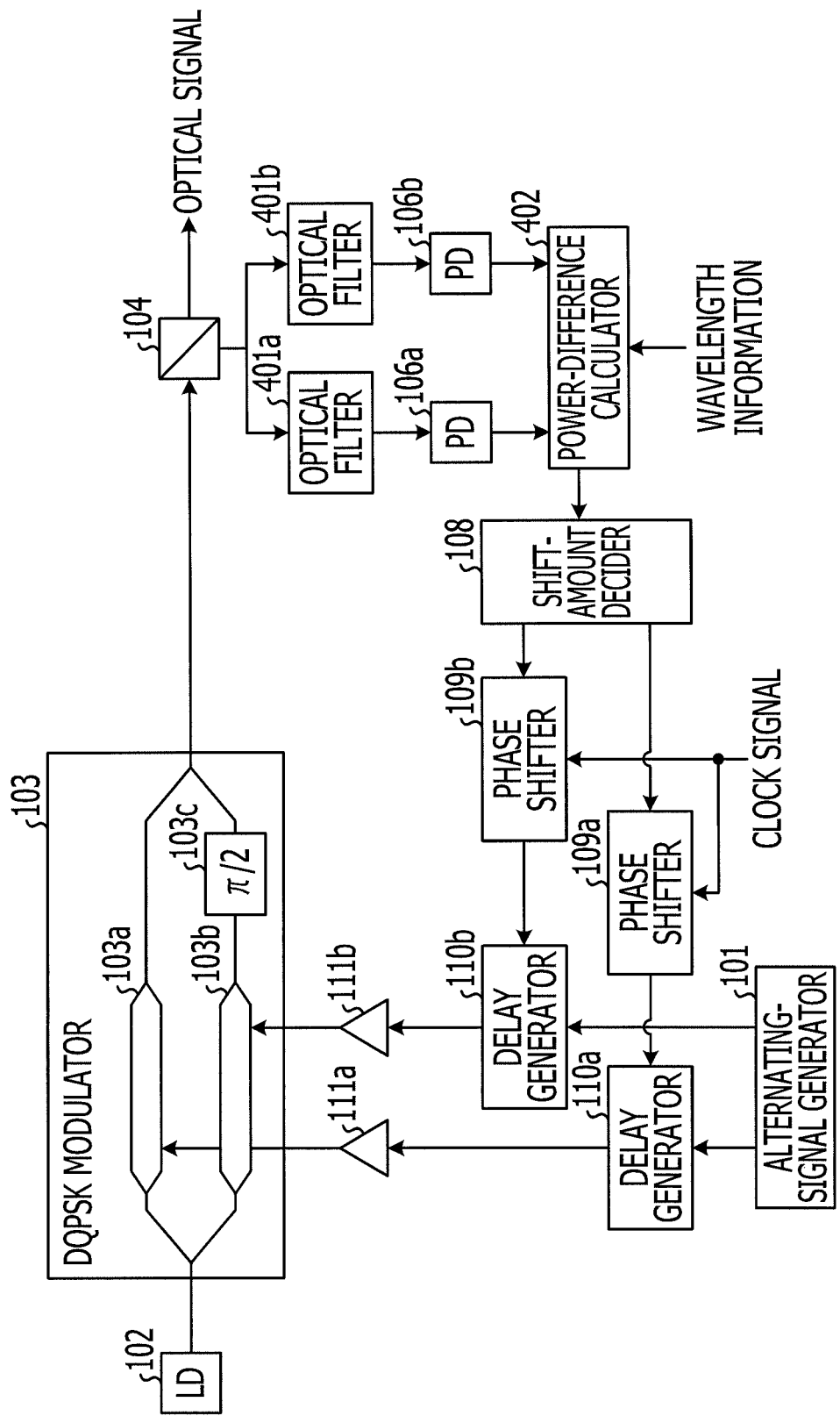
FIG. 11 is a block diagram illustrating a configuration of an optical modulation apparatus according to a fourth embodiment.

FIG. 11 is a block diagram illustrating a configuration of an optical modulation apparatus according to the fourth embodiment. In FIG. 11, like reference characters designate the same or similar components illustrated in FIG. 2 to omit a description thereof. The optical modulation apparatus illustrated in FIG. 11 includes optical filters 401*a* and 401*b* and a power-difference calculator 402 instead of the BPFs 105*a* and 105*b* and the power-difference calculator 107 of the optical modulation apparatus illustrated in FIG. 2, respectively.

The optical filters 401*a* and 401*b* have transmission characteristics corresponding to the wavelength of the light. More specifically, the optical filters 401*a* and 401*b* have, for example, transmission characteristics illustrated in FIG. 12. In the transmission characteristic of the optical filter 401*a*, transmittance increases as the wavelength of light decreases and the frequency increases and the transmittance decreases as the wavelength increases and the frequency decreases. In the transmission characteristic of the optical filter 401*b*, transmittance increases as the wavelength of the light increase and the frequency decreases and the transmittance decreases as the wavelength decreases and the frequency increases.

Accordingly, the optical filter 401*a* outputs relatively high frequency components of the signal, whereas the optical filter 401*b* outputs relatively low frequency components of the signal. That is, the optical filter 401*a* outputs frequency components including more higher-side frequency components, whereas the optical filter 401*b* outputs frequency components including more lower-side frequency components. However, the frequency components output by the optical filters 401*a* and 401*b* are not exactly the higher-side frequency components and the lower-side frequency components, respectively. Additionally, the outputs of the optical filters 401*a* and 401*b* change depending on the wavelength of the optical signal. Accordingly, in this embodiment, the outputs of the optical filters 401*a* and 401*b* are corrected before a power difference between the higher-side frequency components and the lower-side frequency components is determined.

Figure 13:
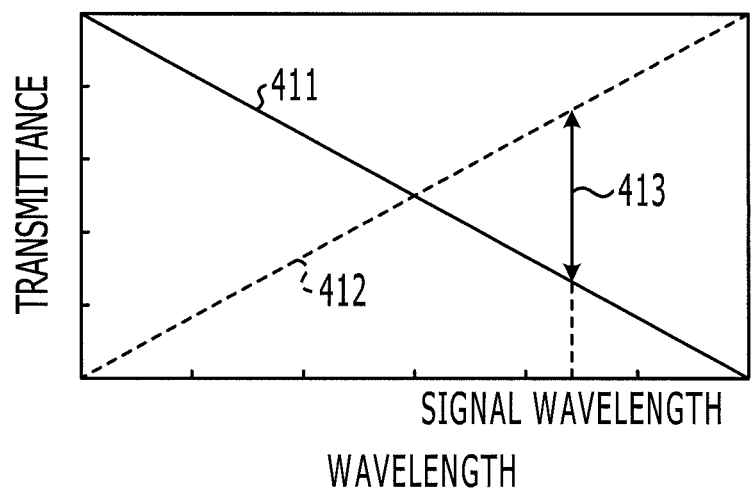
FIG. 13 is a diagram describing an amount of correction on an output of an optical filter.

More specifically, for example, the optical filters 401*a* and 401*b* have transmission characteristics 411 and 412 illustrated in FIG. 13, respectively. In this case, at a signal wavelength illustrated in FIG. 13, a power difference 413 is caused because of a difference of the transmission characteristics of the optical filters 401*a* and 401*b* corresponding to the wavelength of the light. Accordingly, in this embodiment, the output of one of the optical filters is corrected using the power difference 413 serving as a correction amount to cancel the difference of the transmission characteristics corresponding to the wavelength. A power difference caused by a delay difference between two signals at corresponding arms of a DQPSK modulator 103 is then calculated based on the corrected output of the optical filter.

Figure 14:
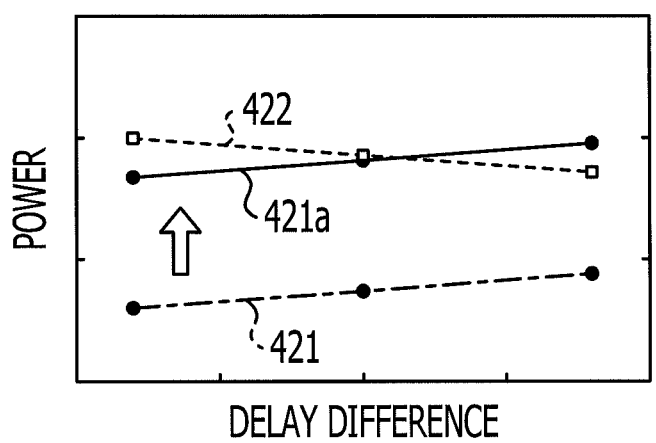
FIG. 14 is a diagram describing correction on an output of an optical filter.

More specifically, the power-difference calculator 402 determines an amount of correcting the outputs of the optical filters 401*a* and 401*b* based on wavelength information of light emitted by an LD 102 and the transmission characteristics of the optical filters 401*a* and 401*b* and then corrects the outputs of the optical filters 401*a* and 401*b*. Thereafter, the power-difference calculator 402 calculates a difference between the corrected outputs of the optical filters 401*a* and 401*b*. More specifically, as illustrated in FIG. 14, the power-difference calculator 402 adds a correction amount determined based on the wavelength information and the transmission characteristics to an actual output 421 of the optical filter 401*a* to determine a corrected output 421*a*. The power-difference calculator 402 then determines a difference between the corrected output 421*a* of the optical filter 401*a* and an output 422 of the optical filter 401*b*.

As illustrated in FIG. 14, the actual output 421 of the optical filter 401*a* is much smaller than the actual output 422 of the optical filter 401*b*. However, the difference between these actual outputs includes not only the power difference resulting from the delay difference at the corresponding arms of the DQPSK modulator 103 but also the power difference resulting from the transmission characteristic difference of the optical filters 401*a* and 401*b* due to the wavelength. Accordingly, in this embodiment, the power difference resulting from the delay difference is calculated by using the power difference 413 resulting from the difference between the transmission characteristics illustrated in FIG. 13 serving as the correction amount. Since the outputs of the optical filters 401a and 401b are corrected using the correction amount based on the wavelength information, the power difference resulting from the delay difference can be accurately calculated in this embodiment even if the wavelength of the light emitted by the LD 102 changes.

Figure 15:
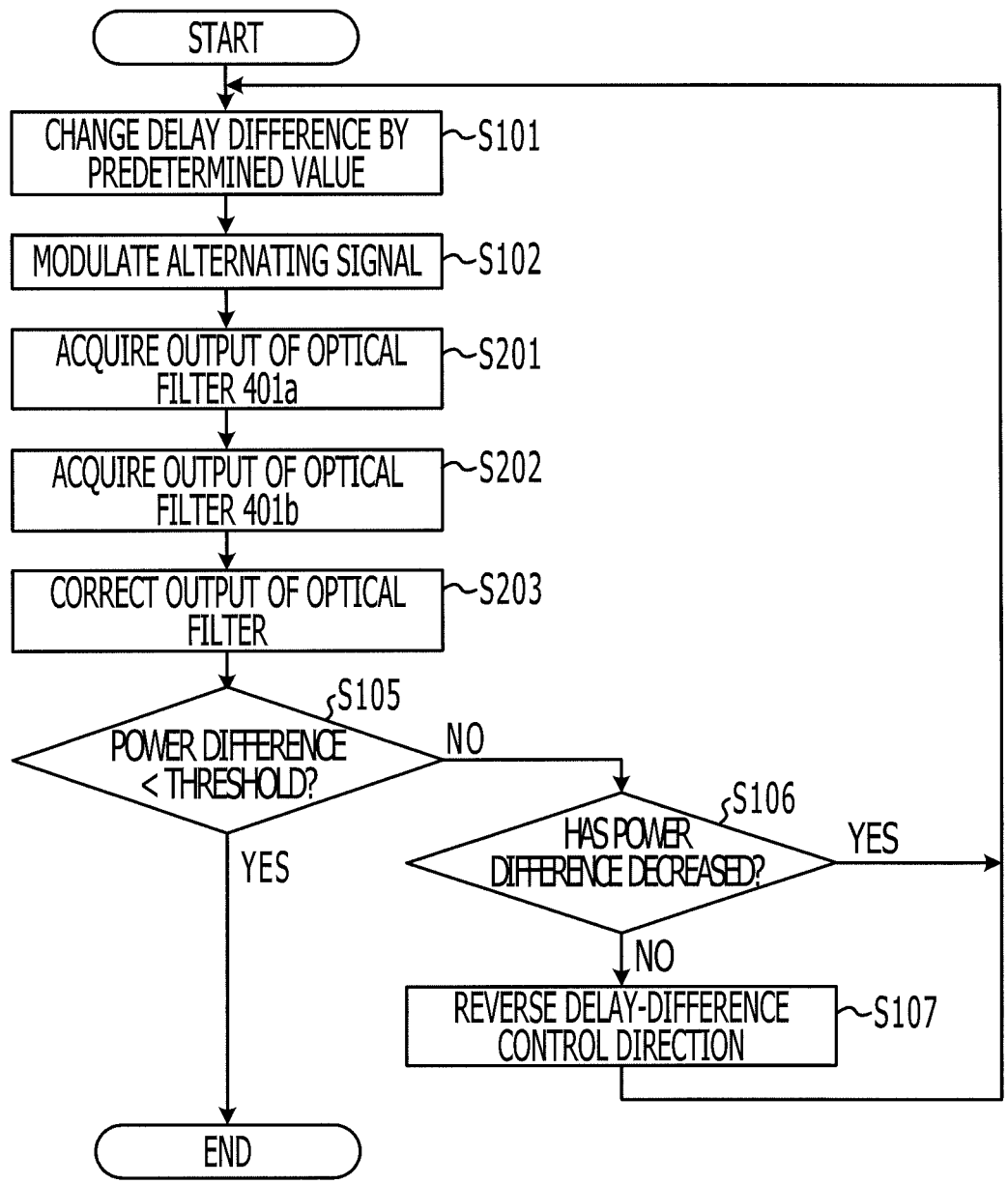
FIG. 15 is a flowchart illustrating a method for controlling a delay difference according to the fourth embodiment.

A delay-difference control method of the optical modulation apparatus having the foregoing configuration will now be described with reference to a flowchart illustrated in FIG. 15. In FIG. 15, like reference characters designate the same or similar operations illustrated in FIG. 6 to omit a detailed description thereof. FIG. 15 describes an operation performed when a delay-difference-based power difference calculated by the power-difference calculator 402 is equal to or larger than a predetermined threshold. If the power difference is smaller than the predetermined threshold, delay-difference control is not needed because optimum phase-shift amounts are already decided by a shift-amount decider 108 and a delay difference between two signals at the corresponding arms of the DQPSK modulator 103 is close to 0.

If the power difference calculated by the power-difference calculator 402 is equal to or larger than the predetermined threshold, the shift-amount decider 108 changes phase-shift amounts set in phase shifters 109a and 109b, thereby changing delays generated in alternating signals by a predetermined value (S101). Upon receiving an alternating signal generated by an alternating-signal generator 101, delay generators 110a and 110b generate in the alternating signal the delays changed by the predetermined value and then output the delayed alternating signals to DRVs 111a and 111b, respectively. The DRVs 111a and 111b output the alternating signals to an I-arm modulator 103a and a Q-arm modulator 103b of the DQPSK modulator 103, where DQPSK modulation is executed (S102).

An optical coupler 104 splits the DQPSK modulation signal and outputs one of the split signals as an optical signal. The other split signal is output to the optical filters 401a and 401b. The optical filter 401a outputs frequency components mainly including higher-side frequency components (S201), whereas the optical filter 401b outputs frequency components mainly including lower-side frequency components (S202). The PDs 106a and 106b convert the respective frequency components into electric signals. The power-difference calculator 402 corrects the outputs of the optical filters 401a and 401b (S203). More specifically, the power difference resulting from the difference between the transmission characteristics of the optical filters 401a and 401b corresponding to the wavelength of the light is cancelled. The power-difference calculator 402 then calculates the power difference between the corrected outputs of the optical filters 401a and 401b and notifies the shift-amount decider 108 of the calculated power difference.

The shift-amount decider 108 determines whether the power difference notified by the power-difference calculator 402 is smaller than a predetermined threshold (S105). If the power difference is smaller than the predetermined threshold (YES in S105), the shift-amount decider 108 determines that the delay difference is sufficiently small and is close to 0. The phase-shift amounts currently set in the phase shifters 109a and 109b are continuously set as optimum phase-shift amounts.

If the power difference is equal to or larger than the predetermined threshold (NO in S105), the shift-amount decider 108 compares the stored power difference notified the last time with the power difference notified this time (S106). If the power difference has decreased from the last one (YES in S106), the shift-amount decider 108 changes the delays of the alternating signals by the predetermined value just like the last time (S101) because it is considered that the delay difference is controlled in an intended direction.

If the power difference has increased from the last one (NO in S106), the shift-amount decider 108 reverses the delay-difference control direction because it is considered that the delay difference is controlled in the unintended direction (S107). After reversing the control direction, the shift-amount decider 108 changes the delays of the alternating signals by the predetermined value (S101).

If the corrected power difference is smaller than the predetermined threshold after repetition of such a delay-difference control operation, the delay difference between the two signals at the corresponding arms of the DQPSK modulator 103 becomes sufficiently small. In this way, degradation of the DQPSK modulation signal is suppressed and a decrease in transmission performance of an optical transmission apparatus for transmitting optical signals is suppressed.

As described above, in accordance with this embodiment, a DQPSK modulation signal is input to two optical filters having different transmission characteristics. Correction is performed so that a power difference resulting form the transmission-characteristic difference is eliminated from outputs of the optical filters. Delays of the alternating signals are adjusted so that the corrected power difference approaches 0. Accordingly, during initial booting of the apparatus, optimum delays can be determined in consideration of an error caused in manufacturing of the apparatus. As a result, during a normal operation of the apparatus, the previously determined optimum delays can be generated in two signals input to the DQPSK modulator so that a delay difference between the two signals at the corresponding arms of the DQPSK modulator becomes sufficiently small and, thus, degradation of an optical signal can be suppressed. That is, even if RZ modulation is not performed on the DQPSK modulation signal, the delay difference between the signals to be multiplexed in multi-level phase modulation is appropriately controlled and degradation of an optical signal is suppressed.

Additionally, even if wavelength of light emitted by a light source changes, the delay difference between the two signals at the corresponding arms of the DQPSK modulator can be appropriately controlled by determining a correction amount according to the wavelength and correcting the outputs of the optical filters.

(Other Embodiments)

Although the optical coupler splits a signal resulting from multi-level phase modulation and higher-side and lower-side frequency components are acquired from the split signal in each of the first to fourth embodiments, phase conjugate light may be used. More specifically, when a Mach-Zehnder interferometer is used in multi-level phase modulation of signals, phase conjugate light is output with a modulation signal. Accordingly, a delay difference can be controlled by acquiring the higher-side and lower-side frequency components from the phase conjugate light instead of the modulation signal.

Figure 16:
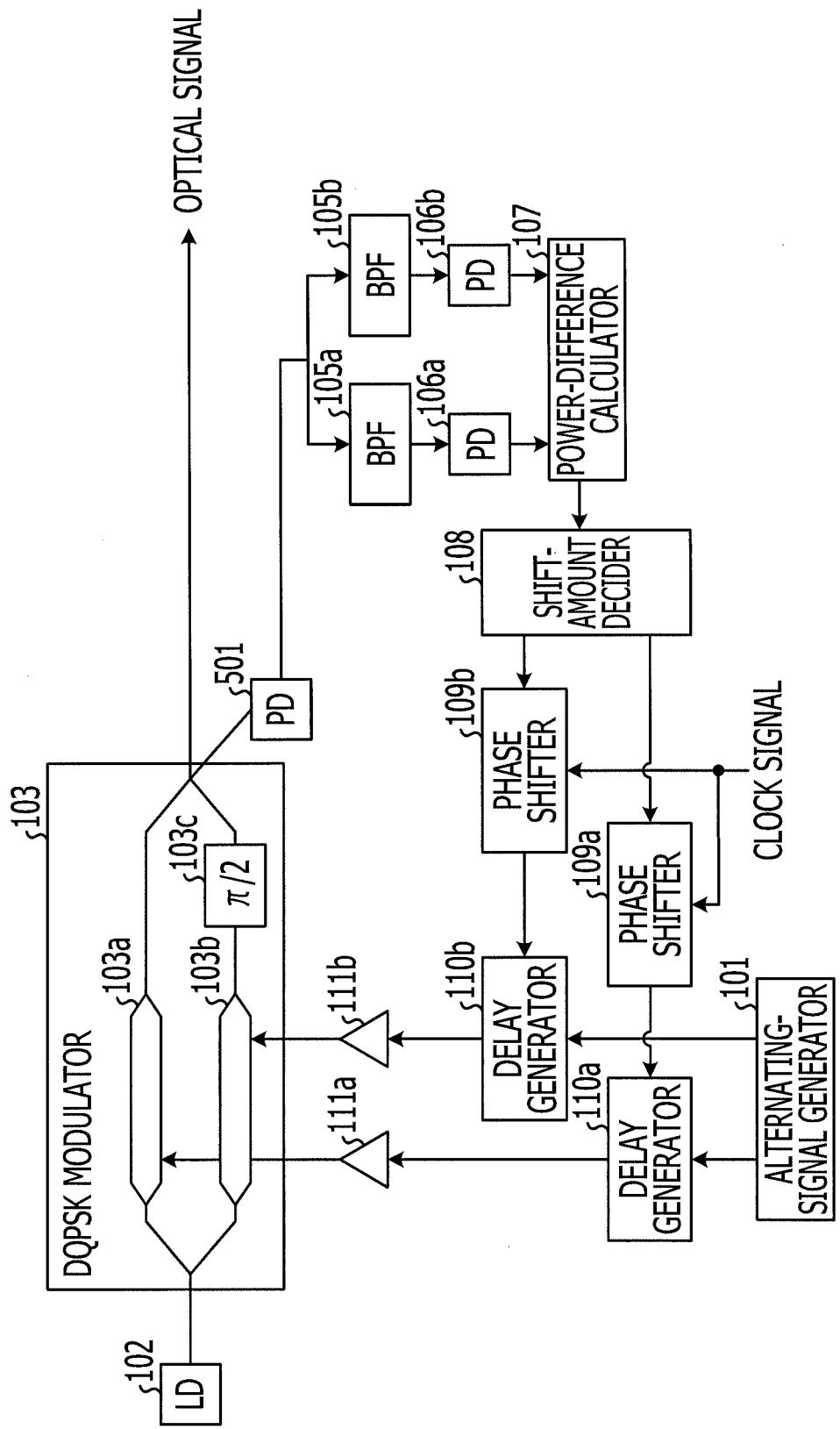
FIG. 16 is a block diagram illustrating an alteration of the optical modulation apparatus.

FIG. 16 is a block diagram illustrating a configuration of an optical modulation apparatus using phase conjugate light. This optical modulation apparatus includes a PD 501. The PD 501 detects phase conjugate light output from a DQPSK modulator 103. Since the phase conjugate light is phase conjugate with a DQPSK modulation signal output from the DQPSK modulator 103, a power difference determined from the phase conjugate light is equivalent to a power difference determined from the DQPSK modulation signal. Accordingly, the optical modulation apparatus illustrated in FIG. 16 calculates a power difference between higher-side frequency components and lower-side frequency components of the phase conjugate light and adjusts delays of the signals input to the DQPSK modulator 103 in accordance with the calculated power difference.

The use of the phase conjugate light can prevent degradation of the DQPSK modulation signal caused by the optical coupler. Accordingly, when an optical signal resulting from the DQPSK modulation is transmitted, a decrease in transmission performance can be suppressed.

In each of the foregoing first to fourth embodiments, the optical modulation apparatus has been described that does not perform RZ modulation after multi-level phase modulation. However, the RZ modulation may be performed after the multi-level phase modulation. More specifically, higher-side and lower-side frequency components are acquired from one of signals resulting from split of a modulation signal by the optical coupler, whereas the RZ modulation may be performed on the other split signal.

Figure 17:
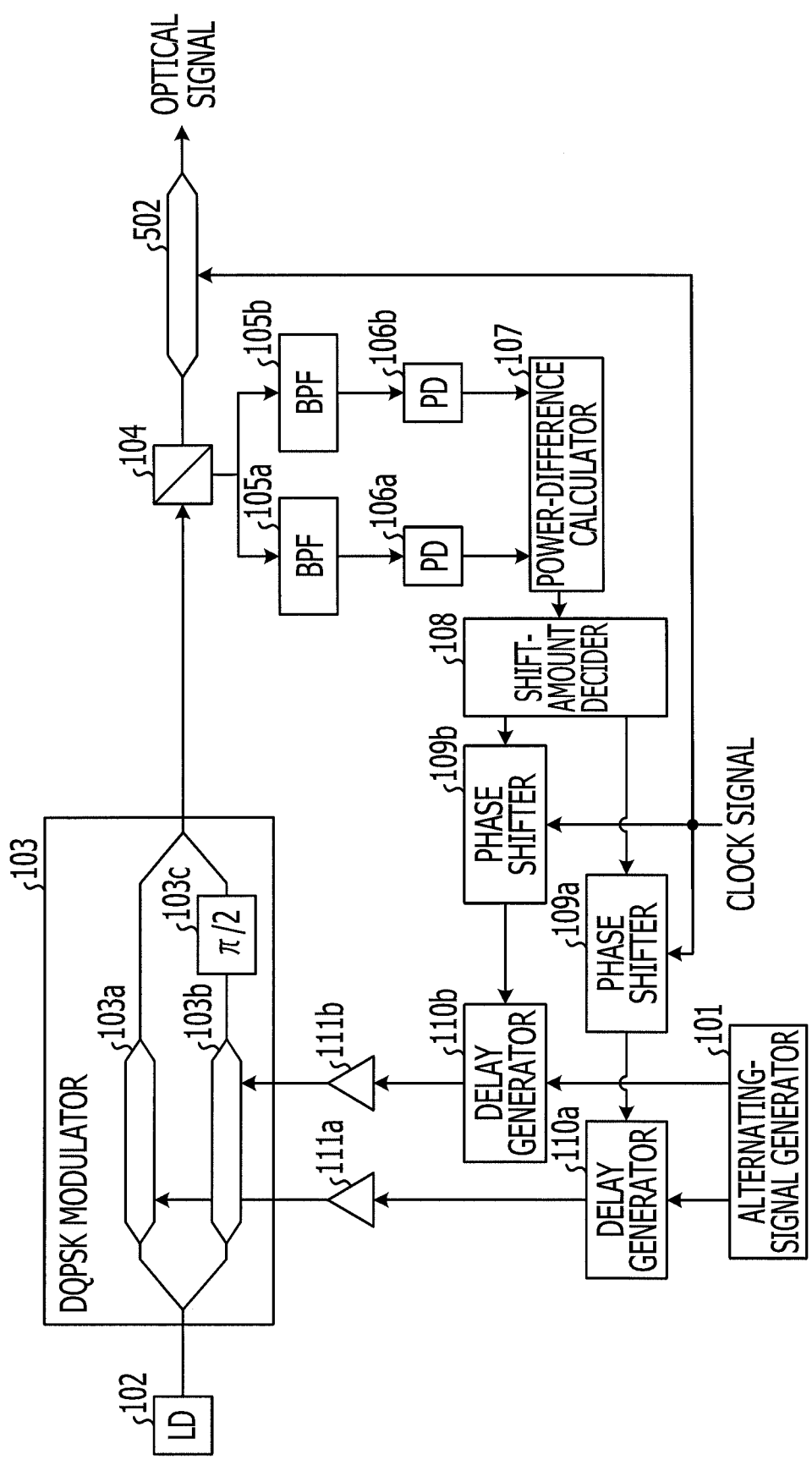
FIG. 17 is a block diagram illustrating another alteration of the optical modulation apparatus.
Figure 18:
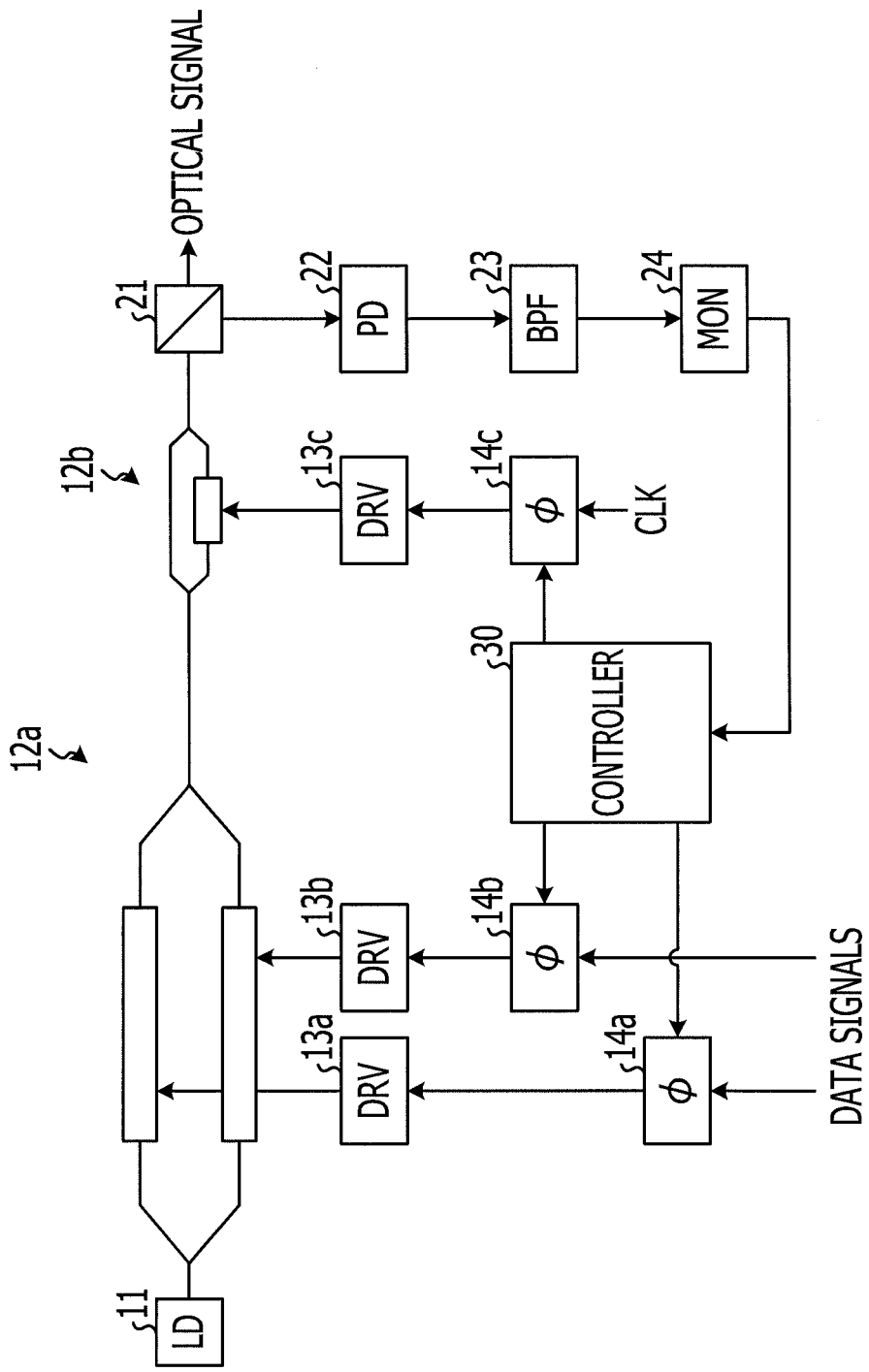
FIG. 18 is a block diagram illustrating a configuration of an optical modulation apparatus including an RZ modulator.
Figure 20:
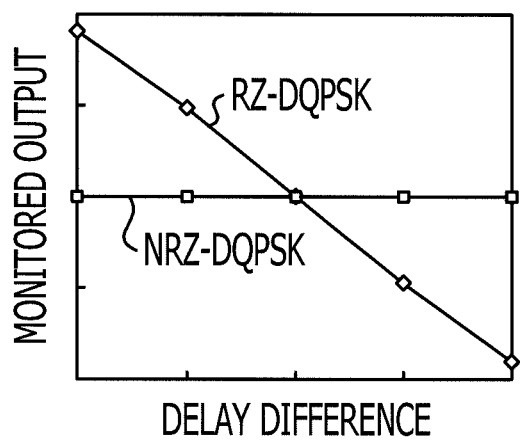
FIG. 20 is a diagram illustrating a difference in monitored output power resulting from different modulation methods.

FIG. 17 is a block diagram illustrating an optical modulation apparatus including an RZ modulator. This optical modulation apparatus includes an RZ modulator 502. The RZ modulator 502 performs RZ modulation on a DQPSK modulation signal. An optical signal resulting from the RZ modulation is output from the RZ modulator 502. An optical coupler 104 is disposed between a DQPSK modulator 103 and the RZ modulator 502. Delays of two signals input to the DQPSK modulator 103 are adjusted based on a power difference between higher-side frequency components and lower-side frequency components of the split signal.

Furthermore, in each of the foregoing first to fourth embodiments, whether a delay difference is appropriately controlled is determined based on whether a power difference has decreased after delays are changed by a predetermined value. However, the appropriate delay-difference control direction and the appropriate delays may be directly determined based on the power difference if a phase difference between two signal components resulting from multi-level phase modulation is available. More specifically, if information that the phase shifter 103c puts forward or delays the phase by $\pi/2$ is available, the appropriate delay-difference control direction can be determined based on whether the power of the higher-side frequency components or that of the lower-side frequency components is larger. Furthermore, the appropriate delays corresponding to the power difference can also be calculated based on the power difference between the higher-side frequency components and the lower-side frequency components.

Although a desired delay is generated in an alternating signal by shifting a phase of a clock signal in each of the foregoing second to fourth embodiments, the delay adjusting method is not limited to this one. More specifically, the desired delay may be generated by directly shifting a phase of the alternating signal based on the calculated power difference. Furthermore, it is assumed in each of the foregoing second to fourth embodiments that DQPSK modulation is performed as an example of multi-level phase modulation. However, even if other multi-level phase modulation is performed, a delay difference can be controlled based on the power difference between the higher-side frequency components and the lower-side frequency components of the multi-level modulation signal.

According to one embodiment of optical modulation apparatuses and optical modulation methods disclosed herein, a delay difference between signals to be multiplexed in multi-level phase modulation is appropriately controlled and degradation of an optical signal can be advantageously suppressed even if RZ modulation is not performed on a multilevel-phase modulation signal.

According to an aspect of the embodiments of the invention, any combinations of one or more of the described features, functions, operations, and/or benefits can be provided. A combination can be one or a plurality. The embodiments are not limited to the first and second input signals. The patterned signal may be predetermined, generated, and/or determined. Two or more inputs signals may be provided. The embodiments can be implemented as an apparatus (a machine) that includes the described optical modulation components and/or further include and/or be provided with computing hardware (e.g., hardware logic circuitry, etc.) and/or in computing device (i.e., computing apparatus), such as (in a non-limiting example) any computer that can store, retrieve, process and/or output data and/or communicate (network) with other computers. According to an aspect of an embodiment, the described features, functions, operations, and/or benefits can use and/or be implemented by computing hardware and/or software, for example, for generating and/or storing threshold values, data and/or patterned signals, calculating, etc. Computing hardware apparatus can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing aspects of the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing aspects of the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. An optical modulation apparatus comprising:
   a first modulator configured to modulate light emitted by a light source using a first input signal having a pattern and output a first modulated signal;
   a second modulator configured to modulate the light using a second input signal having the pattern and output a second modulated signal;
   a multiplexer configured to multiplex the first and second modulated signals and output a multiplexed signal;
   a calculator configured to calculate a power difference between a higher-side frequency component having a frequency higher than a center frequency of the multiplexed signal and a lower-side frequency component having a frequency lower than the center frequency; and
   an adjustor configured to adjust a delay between the first input signal and the second input signal based on the power difference.

2. The optical modulation apparatus according to claim 1, wherein the calculator includes:
   a first band-pass filter having a passband corresponding to the higher-side frequency component; and
   a second band-pass filter having a passband corresponding to the lower-side frequency component, and
   the calculator calculates a difference between an output of the first band-pass filter and an output of the second band-pass filter.

3. The optical modulation apparatus according to claim 1, wherein the calculator includes:
   a first etalon filter having a periodical passband for a frequency different from the center frequency of the multiplexed signal; and
   a second etalon filter having a periodical passband for passing a frequency different from the center frequency of the multiplexed signal, the passband of the second etalon filter being complementary to the passband of the first etalon filter, and
   the calculator calculates a difference between an output of the first etalon filter and an output of the second etalon filter.

4. The optical modulation apparatus according to claim 1, wherein
   the calculator includes:
      a first optical filter having a transmission characteristic by which transmittance decreases as wavelength of light increases; and
      a second optical filter having a transmission characteristic by which transmittance increases as wavelength of light increases, and
   the calculator corrects an output of the first optical filter and/or the second optical filter based on a difference between the transmission characteristics and calculates a difference between the corrected output and an output of the other one of the first optical filter and the second optical filter.

5. The optical modulation apparatus according to claim 1, wherein
   the calculator acquires the higher-side frequency component and the lower-side frequency component from a phase conjugate light and calculates the power difference between the acquired higher-side frequency component and the acquired lower-side frequency component, the phase conjugate light being output at a time of the multiplexing of the modulation signals by the multiplexer and being phase conjugate with the multiplexed signal.

6. The optical modulation apparatus according to claim 1, further comprising:
   a return-to-zero (RZ) modulator configured to perform RZ modulation on the multiplexed signal, wherein
   the calculator acquires the higher-side frequency component and the lower-side frequency component from the multiplexed signal before the RZ modulation is performed on the multiplexed signal by the RZ modulator and calculates the power difference between the acquired higher-side frequency component and the acquired lower-side frequency component.

7. The optical modulation apparatus according to claim 1, wherein
   the adjustor performs a control operation for changing a delay difference between the input signals input to the first modulator and the second modulator by a predetermined value.

8. The optical modulation apparatus according to claim 7, wherein
   the adjustor terminates the delay-difference control operation when the power difference calculated by the calculator is smaller than a predetermined threshold.

9. The optical modulation apparatus according to claim 7, wherein
   the adjustor reverses a direction of controlling the delay difference when the power difference calculated by the calculator has increased as a result of changing the delay difference by the predetermined value.

10. The optical modulation apparatus according to claim 1, wherein the adjustor includes:
    a decider configured to decide two different phase-shift amounts of a clock signal based on the power difference calculated by the calculator;
    a shifter configured to shift a phase of the clock signal by each of the phase-shift amounts decided by the decider; and
    a generator configured to generate delays in the input signals input to the first modulator and the second modulator based on the clock signals whose phases are shifted by the shifter, respectively.

11. An optical modulation method comprising:
    modulating light using a first input signal having a pattern and outputting a first modulated signal;
    modulating the light using a second input signal having the pattern and outputting a second modulated signal;
    multiplexing the first and second modulated signals and outputting a multiplexed signal;
    calculating a power difference between a higher-side frequency component having a frequency higher than a center frequency of the multiplexed signal and a lower-side frequency component having a frequency lower than the center frequency; and
    adjusting a delay between the first input signal and the second input signal based on the power difference.

12. An optical modulation device comprising:
    a modulator configured to modulate light emitted by a light source using first and second input signals and output modulated signals;
    a calculator configured to calculate a power difference between a higher-side frequency component having a frequency higher than a center frequency of a multiplexed signal of the modulated signals and a lower-side frequency component having a frequency lower than the center frequency; and an adjustor configured to adjust a delay between the first input signal and the second input signal based on the power difference.

* * * * *